US012181836B2

(12) United States Patent
Kadokura et al.

(10) Patent No.: US 12,181,836 B2
(45) Date of Patent: Dec. 31, 2024

(54) ELECTROSTATIC CHARGE IMAGE DEVELOPING CARRIER, ELECTROSTATIC CHARGE IMAGE DEVELOPER, PROCESS CARTRIDGE, IMAGE FORMING APPARATUS AND IMAGE FORMING METHOD

(71) Applicant: FUJIFILM Business Innovation Corp., Tokyo (JP)

(72) Inventors: Yasuo Kadokura, Minamiashigara (JP); Yosuke Tsurumi, Minamiashigara (JP); Takuro Watanabe, Minamiashigara (JP); Kazutsuna Sasaki, Minamiashigara (JP); Karin Sakai, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 200 days.

(21) Appl. No.: 17/386,211

(22) Filed: Jul. 27, 2021

(65) Prior Publication Data

US 2022/0308492 A1 Sep. 29, 2022

(30) Foreign Application Priority Data

Mar. 23, 2021 (JP) ................................ 2021-049115

(51) Int. Cl.

*G03G 9/113* (2006.01)
*G03G 9/08* (2006.01)
*G03G 9/107* (2006.01)

(52) U.S. Cl.

CPC ......... *G03G 9/1139* (2013.01); *G03G 9/0819* (2013.01); *G03G 9/1085* (2020.08); *G03G 9/1134* (2013.01)

(58) Field of Classification Search

CPC .. G03G 9/1139; G03G 9/1085; G03G 9/0819; G03G 9/1134

See application file for complete search history.

(56) References Cited

U.S. PATENT DOCUMENTS

| | | | | |
|---|---|---|---|---|
| 8,455,168 B2 * | 6/2013 | Kiyono | G03G 9/1134 | 430/111.4 |
| 2006/0291911 A1 * | 12/2006 | Yamashita | G03G 9/1075 | 430/111.32 |

(Continued)

FOREIGN PATENT DOCUMENTS

| | | |
|---|---|---|
| EP | 1 477 863 A2 | 11/2004 |
| EP | 2 090 934 A1 | 8/2009 |

(Continued)

OTHER PUBLICATIONS

Pao Na Nakorn, Supatra Jinawath and Shigetaka Wada, "Mechanical Strength and Thermal Conductivity of High Purity Al2O3 Ceramics using AKP-30 Powder", J. Sci. Res. Chula. Univ., vol. 30, No. 1 (2005), p. 80. (Year: 2005).*

(Continued)

*Primary Examiner* — Peter L Vajda
*Assistant Examiner* — Boone Alexander Evans
(74) *Attorney, Agent, or Firm* — Sughrue Mion, PLLC

(57) ABSTRACT

An electrostatic charge image developing carrier, contains: a magnetic particle; and a coating resin layer coating the magnetic particle and containing inorganic particles, in which an area ratio of the inorganic particles that is a ratio of a total area of the inorganic particles to an area of the coating resin layer in a cut surface of the coating resin layer along a thickness direction of the coating resin layer is 10% or more and 50% or less.

18 Claims, 3 Drawing Sheets

(56) References Cited

U.S. PATENT DOCUMENTS

| | | | | |
|---|---|---|---|---|
| 2011/0091802 | A1 | 4/2011 | Takahashi et al. | |
| 2011/0171573 | A1 | 7/2011 | Sakata et al. | |
| 2014/0072910 | A1* | 3/2014 | Iwatsuki | G03G 9/1137 430/111.1 |
| 2014/0248557 | A1* | 9/2014 | Yaguchi | G03G 15/09 399/111 |
| 2016/0306301 | A1 | 10/2016 | Sugahara et al. | |
| 2018/0143557 | A1* | 5/2018 | Ueda | G03G 9/0821 |

FOREIGN PATENT DOCUMENTS

| | | | |
|---|---|---|---|
| JP | 7-181748 | A | 7/1995 |
| JP | 2004-341252 | A | 12/2004 |
| JP | 2007-219118 | A | 8/2007 |
| JP | 2008-304745 | A | 12/2008 |
| JP | 2009-64003 | A | 3/2009 |
| JP | 2009-192675 | A | 8/2009 |
| JP | 2010-271521 | A | 12/2010 |
| JP | 2018-200372 | A | 12/2018 |
| JP | 2018-205408 | A | 12/2018 |
| JP | 2019-215478 | A | 12/2019 |

OTHER PUBLICATIONS

Search Report issued Feb. 22, 2022 by the European Patent Office in counterpart European Patent Application No. 21195699.0.

Office Action issued on Oct. 1, 2024 by the Japan Patent Office in counterpart Japanese Patent Application No. 2021-049115.

* cited by examiner

ELECTROSTATIC CHARGE IMAGE DEVELOPING CARRIER, ELECTROSTATIC CHARGE IMAGE DEVELOPER, PROCESS CARTRIDGE, IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2021-049115 filed on Mar. 23, 2021.

BACKGROUND

1. Technical Field

The present invention relates to an electrostatic charge image developing carrier, an electrostatic charge image developer, a process cartridge, an image forming apparatus, and an image forming method.

2. Related Art

Methods for visualizing image information such as electrophotography are currently used in various fields. In the electrophotography, an electrostatic charge image is formed as image information on a surface of an image carrier by charging and electrostatic charge image formation. Then, a toner image is formed on the surface of the image carrier by a developer containing a toner, transferred to a recording medium, and then fixed to the recording medium. Through these steps, the image information is visualized as an image.

For example, JP-A-2018-200372 discloses "an electrostatic latent image developing carrier including: plural carrier particles each including a carrier core; and a first coat layer and a second coat layer that cover a surface of the carrier core, in which the first coat layer and the second coat layer have a laminated structure in which the first coat layer and the second coat layer are laminated in this order from the surface of the carrier core, the first coat layer contains a first thermosetting resin, the second coat layer contains a second thermosetting resin, surface adsorbability of the first coat layer is 70 nN or more and 100 nN or less, and pencil hardness of the second coat layer is 2H or more and 6H or less."

JP-A-2007-219118 discloses "a two-component developer including: a toner having a volume median particle diameter of 3 μm to 8 μm in which inorganic fine particles are adhered to colored particles; and a carrier having a mass average particle diameter of 20 μm to 40 μm to which the inorganic fine particles are adhered, in which an area ratio measured by an X-ray analyzer at a carrier surface of an element (A) constituting the inorganic fine particles adhered to the toner is 0.5 area % to 3.0 area %."

JP-A-2008-304745 discloses "an electrostatic charge image developing developer containing a carrier having a coating resin layer on a carrier core material and a toner, in which the carrier contains 7 mass % to 35 mass % of silica or carbon black in the coating resin layer, a resin to be coated has a weight average molecular weight (Mw) of 300,000 to 600,000, and the toner contains external additive fine particles having a number average particle diameter of 70 nm to 300 nm."

JP-A-H07-181748 discloses an "electrostatic latent image developing two-component developer, including: a coat carrier to which at least a coating film of a core particle is applied; and a toner containing at least a binder resin, a colorant, and a polarity control agent and obtained by externally adding an inorganic fine powder to particles having a volume average particle diameter of 5 μm to 10 μm, in which when a horizontal axis represents surface hardness (pencil hardness in a pencil scratch test defined by JIS K5400) of the coat carrier and a vertical axis represents a product of a square root of a specific surface area in a BET method of an external additive of the toner and an addition amount (wt %) with respect to the toner, these relations are within a range surrounded by points A, B, C, and D."

JP-A-2010-271521 discloses an "electrostatic latent image developing carrier obtained by forming a coating layer made of resin and inorganic fine particles on a surface of at least magnetic particles, in which the inorganic fine particles have an anisotropic structure and are oriented in the coating layer so as to be substantially parallel to a surface of the coating layer."

SUMMARY

Aspects of non-limiting embodiments of the present disclosure relate to an electrostatic charge image developing carrier that includes a magnetic particle and a coating resin layer coating the magnetic particle and containing inorganic particles, and has excellent toner charge maintainability as compared with a case where an area ratio of the inorganic particles that is a ratio of a total area of the inorganic particles to an area of the coating resin layer in a cut surface of the coating resin layer along a thickness direction of the coating resin layer is less than 10% or more than 50%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing carrier, containing:

a magnetic particle; and a coating resin layer coating the magnetic particle and containing inorganic particles, in which an area ratio of the inorganic particles that is a ratio of a total area of the inorganic particles to an area of the coating resin layer in a cut surface of the coating resin layer along a thickness direction of the coating resin layer is 10% or more and 50% or less.

BRIEF DESCRIPTION OF THE DRAWINGS

Exemplary embodiment(s) of the present invention will be described in detail based on the following figures, wherein.

DETAILED DESCRIPTION

Figure 1:
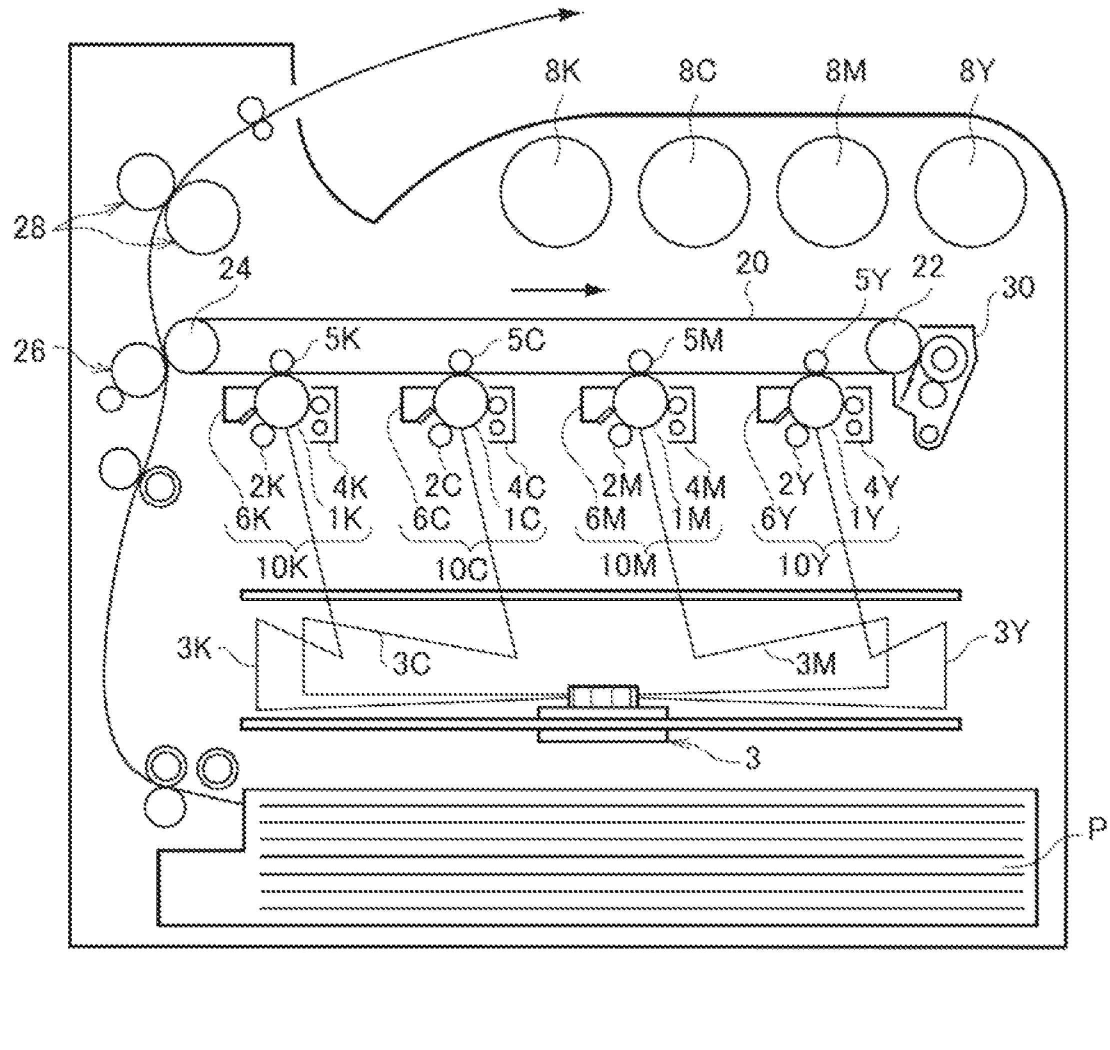
FIG. 1 is a schematic configuration diagram illustrating an example of an image forming apparatus according to the present exemplary embodiment.

Hereinafter, an exemplary embodiment as an example of the present invention will be described. These descriptions and examples illustrate the present invention and do not limit the present invention.

In the present description, a numerical range indicated by "to" indicates a range including numerical values before and after "to" as a minimum value and a maximum value, respectively.

In the numerical ranges described in stages in the present description, an upper limit or a lower limit described in one numerical range may be replaced with an upper limit or a lower limit of the numerical range described in other stages. In the numerical ranges described in the present disclosure, the upper limit or the lower limit of the numerical range may be replaced with values shown in Examples.

In the present description, the term "step" indicates not only an independent step, and even when a step cannot be clearly distinguished from other steps, this step is included in the term "step" as long as the intended purpose of the step is achieved.

When an exemplary embodiment is described in the present description with reference to drawings, a configuration of the exemplary embodiment is not limited to a configuration illustrated in the drawings. Sizes of members in each drawing are conceptual, and a relative size relation between the members is not limited to this.

In the present description, each component may include plural corresponding substances. In the present disclosure, in a case of referring to an amount of each component in a composition, when there are plural substances corresponding to each component in the composition, unless otherwise specified, it refers to a total amount of the plural substances present in the composition.

In the present description, plural kinds of particles corresponding to each component may be selected. In a case where there are plural kinds of particles corresponding to each component in a composition, unless otherwise specified, a particle diameter of each component means a value for a mixture of the plural kinds of particles present in the composition.

In the present description, the term "(meth)acryl" means at least one of acryl and methacryl, and the term "(meth) acrylate" means at least one of acrylate and methacrylate.

In the present description, the term "electrostatic charge image developing toner" may be simply referred to as a "toner", the term "electrostatic charge image developing carrier" may be simply referred to as a "carrier", and the term "electrostatic charge image developer" may be simply referred to as a "developer".

<Electrostatic Charge Image Developing Carrier>

A carrier according to the present exemplary embodiment includes a magnetic particle and a coating resin layer coating the magnetic particle and containing inorganic particles.

An area ratio of the inorganic particles in the cut surface of the coating resin layer along the thickness direction of the coating resin layer is 10% or more and 50% or less.

The carrier according to the present exemplary embodiment has excellent toner charge maintainability according to the above configuration. The reasons are presumed as follows.

The toner and the carrier are stirred under a coexisting state in a developing unit. Thereby, the toner is charged.

However, when the toner and the carrier are continuously stirred, an external additive (particularly, silica particles) of the toner adheres to the carrier. Then, the external additive is embedded in the coating resin layer of the carrier. Therefore, chargeability of the carrier decreases over time, and a charging property of the toner decreases over time.

In the carrier according to the present exemplary embodiment, the area ratio of the inorganic particles in the cut surface of the coating resin layer along the thickness direction of the coating resin layer is 10% or more and 50% or less.

In a case where the inorganic particles are contained in the coating resin layer so that the area ratio is within the above range, the coating resin layer becomes hard due to an enhanced filler effect of the inorganic particles. As a result, even if the external additive adheres to the carrier, the external additive is difficult to be embedded in the coating resin layer.

In a case where the inorganic particles are contained in the coating resin layer so that the area ratio is within the above range, fine ruggedness is appropriately imparted to a surface of the coating resin layer by the inorganic particles, and an adhesive force of the carrier to the external additive is reduced. As a result, even if the external additive adheres to the carrier, the external additive easily separates from the carrier.

Therefore, decrease in the chargeability of the carrier is prevented.

From the above, it is presumed that the carrier according to the present exemplary embodiment is excellent in the toner charge maintainability.

Hereinafter, the carrier according to the present exemplary embodiment will be described in detail.

(Area Ratio of Inorganic Particles)

The area ratio of the inorganic particles in the cut surface of the coating resin layer along the thickness direction of the coating resin layer is 10% or more and 50% or less.

When the area ratio of the inorganic particles is in the above range, the fine ruggedness is appropriately imparted to the surface of the coating resin layer by the inorganic particles, and the adhesive force of the carrier to the external additive is reduced. As a result, the toner charge maintainability is further improved.

From the viewpoint of improving the toner charge maintainability, the area ratio of the inorganic particles is more preferably 10% or more and 40% or less, and still more preferably 15% or more and 35% or less.

The area ratio of the inorganic particles can be controlled by the amount of the inorganic particles contained in the coating resin layer, and the area ratio of the inorganic particles becomes higher as the amount of the inorganic particles relative to the resin increases.

Here, the area ratio of the inorganic particles is measured as follows.

The carrier is embedded by the epoxy resin and cut with the microtome, and the sample having the carrier cross section as the observation surface is prepared. An SEM image (magnification: 20,000 times) obtained by capturing a cross section of the coating resin layer in the carrier cross section with a scanning electron microscope (SEM) is taken into an image processing analyzer for image analysis.

In the SEM image of the carrier cross section, an area of the inorganic particles in the cross section of the coating resin layer is measured, and the area ratio of the inorganic particles is calculated by an equation: the area ratio of the inorganic particles=a total area of the inorganic particles/the area of the coating resin layer×100.

Identification of the inorganic particles in the cross section of the coating resin layer is performed by energy dispersive X-ray spectroscopy (SEM-EDX).

(Average of Distances between Centers of Gravity of Inorganic Particles)

In the carrier according to the present exemplary embodiment, in the cut surface of the coating resin layer along the thickness direction of the coating resin layer, an average of distances between centers of gravity of the inorganic particles is preferably 200 nm or less, more preferably 180 nm or less, and still more preferably 150 nm or less, each of the distances between centers of gravity of the inorganic particles being a distance between centers of gravity of a pair of two particles of the inorganic particles, one particle of the pair being farthest from the other particle of the pair without interposing any particle of the inorganic particles other than the pair of the two particles.

A lower limit of the average of distances between centers of gravity of the inorganic particles is, for example, 10 nm or more.

When the average of distances between centers of gravity of the inorganic particles is within the above range, the filler effect of the inorganic particles is further enhanced and the coating resin layer becomes harder due to the inorganic particles. As a result, even if the external additive adheres to the carrier, the external additive is further difficult to be embedded in the coating resin layer. When the average of distances between centers of gravity of the inorganic particles is in the above range, fine ruggedness is appropriately imparted to the surface of the coating resin layer by the inorganic particles, and the adhesive force of the carrier to the external additive is further reduced. As a result, even if the external additive adheres to the carrier, the external additive further easily separates from the carrier. As a result, the toner charge maintainability is further improved.

The average of distances between centers of gravity of the inorganic particles is measured as follows.

The carrier is embedded by the epoxy resin and cut with the microtome, and the sample having the carrier cross section as the observation surface is prepared. An SEM image (magnification 20,000) obtained by capturing the cross section of the coating resin layer in the carrier cross section with the scanning electron microscope (SEM) is taken into the image processing analyzer for image analysis.

The SEM image of the carrier cross section is taken into an image analyzer (LUZEX III, manufactured by Nireco Co., Ltd.), the number of pixels in a region of the inorganic particles is n, and x and y coordinates of each pixel are xi, yi (i=1, 2, . . . , n). An x coordinate of the center of gravity of the inorganic particle is specified as a value obtained by dividing a total of each xi coordinate value by n, and a y coordinate of the center of gravity of the inorganic particle is specified as a value obtained by dividing a total of each yi coordinate value by n.

Next, centering on one inorganic particle to be measured, a linear distance between a center of gravity of the one inorganic particle to be measured and a center of gravity of an inorganic particle around the one inorganic particle is measured. However, when a straight line is drawn between the center of gravity of the one inorganic particle to be measured and the center of gravity of the inorganic particle around the one inorganic particle, if another inorganic particle is interposed on the straight line, this linear distance between the centers of gravity of the inorganic particles is excluded from measurement.

Figure 3:
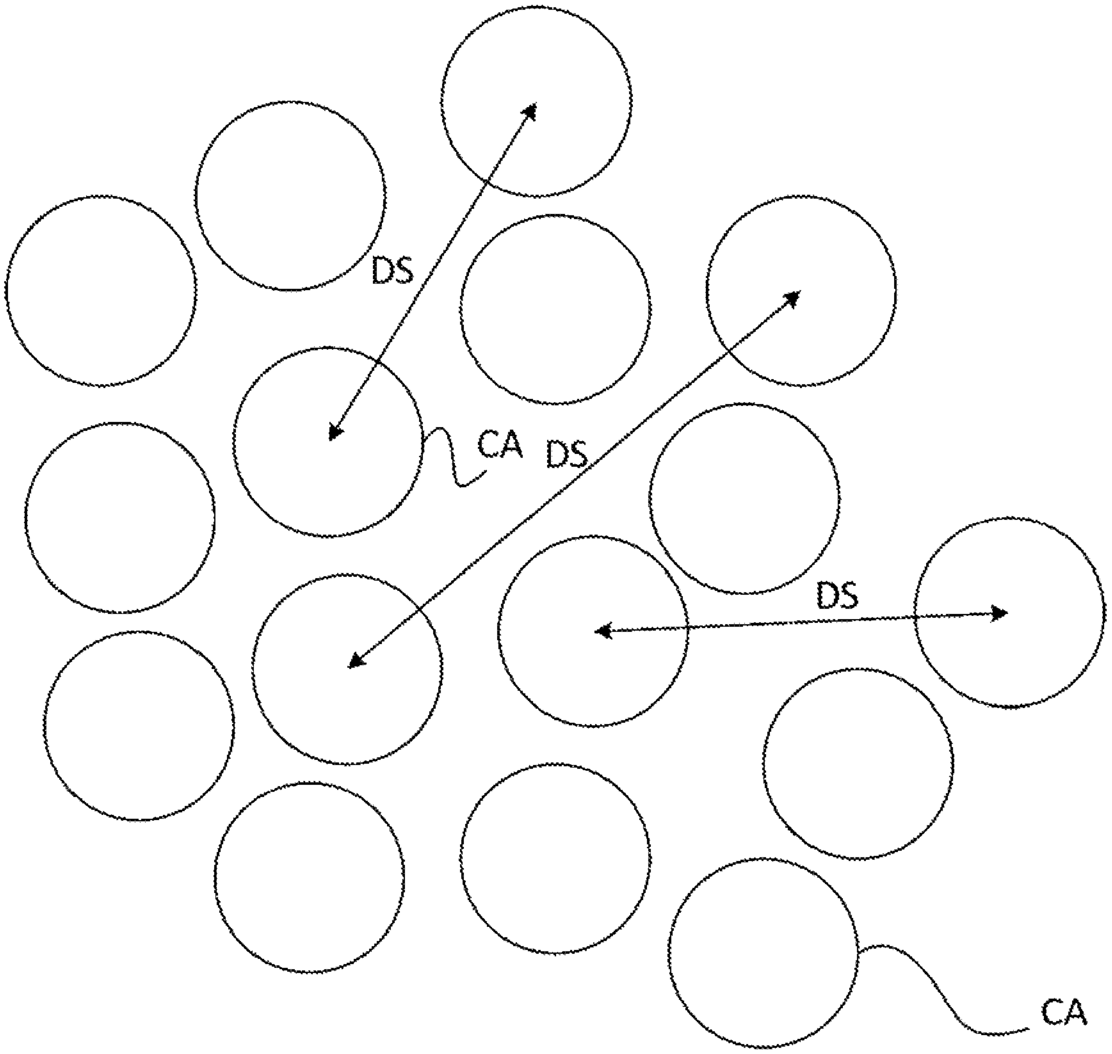
FIG. 3 is a schematic diagram in a carrier according to the present exemplary embodiment for explaining measurement of an average of distances between centers of gravity of the inorganic particles, each of the distances between centers of gravity of the inorganic particles being a distance between centers of gravity of a pair of two particles of the inorganic particles, one particle of the pair being farthest from the other particle of the pair without interposing any particle of the inorganic particles other than the pair of the two particles.

Among measured linear distances between the center of gravity of the inorganic particle to be measured and centers of gravity of inorganic particles around the inorganic particle to be measured, the longest linear distance is defined as the "distance between centers of gravity of a pair of two particles of the inorganic particles, one particle of the pair being farthest from the other particle of the pair without interposing any particle of the inorganic particles other than the pair of the two particles(see DS in FIG. 3)." In FIG. 3, CA indicates a carrier.

Then, these operations are performed 20 times, and an arithmetic average value of the measured distances between centers of gravity of the inorganic particles is defined as the "average of distances between centers of gravity of the inorganic particles, each of the distances between centers of gravity of the inorganic particles being a distance between centers of gravity of a pair of two particles of the inorganic particles, one particle of the pair being farthest from the other particle of the pair without interposing any particle of the inorganic particles other than the pair of the two particles."

In the carrier according to the present exemplary embodiment, in order to satisfy the area ratio of the inorganic particles and the average of distances between centers of gravity of the inorganic particles, it is preferable that the carrier has suitable aspects described later.

(Configuration of Carrier)

A carrier according to the present exemplary embodiment includes a magnetic particle and a coating resin layer coating the magnetic particle.

[Magnetic Particle]

The magnetic particle is not particularly limited, and known magnetic particles used as a core material of the carrier are applied. Specific examples of the magnetic particle include: a particle of a magnetic metal such as iron, nickel, and cobalt; a particle of a magnetic oxide such as ferrite and magnetite; a resin-impregnated magnetic particle obtained by impregnating a porous magnetic powder with a resin; and a magnetic powder-dispersed resin particle in which a magnetic powder is dispersed and blended in a resin. A ferrite particle is preferred as the magnetic particle in the present exemplary embodiment.

A volume average particle diameter of the magnetic particle is preferably 15 μm or more and 100 μm or less, more preferably 20 μm or more and 80 μm or less, and still more preferably 30 μm or more and 60 μm or less.

The volume average particle diameter of the magnetic particle is measured by the following method.

A particle size distribution is measured using a laser diffraction/scattering particle size distribution measuring device (LS Particle Size Analyzer (manufactured by Beckman Coulter, Inc.)). As an electrolytic solution, ISOTON-II (manufactured by Beckman Coulter, Inc.) is used. The number of particles to be measured is 50,000.

A divided particle size range (channel) is set and a volume-based particle size distribution is obtained. Then, a cumulative distribution is drawn from a small particle diameter side and a particle diameter corresponding to the cumulative percentage of 50% with respect to all the particles is defined as "the volume average particle diameter D50V".

An arithmetic average height Ra (JIS B0601:2001) of the roughness curve of the magnetic particle is obtained by observing the magnetic particle at an appropriate magnification (for example, a magnification of 1000 times) using a surface shape measuring device (for example, "Ultra Depth Color 3D shape measurement microscope VK-9700" manufactured by KEYENCE CORPORATION), obtaining a roughness curve at a cutoff value of 0.08 mm, and extracting a reference length of 10 μm from the roughness curve in a direction of an average line thereof. The arithmetic average value of Ra of 100 magnetic particles is preferably 0.1 μm or more and 1 μm or less, and more preferably 0.2 μm or more and 0.8 μm or less.

As for a magnetic force of the magnetic particle, saturation magnetization in a magnetic field of 3,000 Oersted is preferably 50 emu/g or more, and more preferably 60 emu/g or more. The saturation magnetization is measured using a vibration sample type magnetic measuring device VSMP10-15 (manufactured by Toei Industry Co., Ltd.). A measurement sample is packed in a cell having an inner diameter of 7 mm and a height of 5 mm and set in the device. The measurement is performed by applying an applied magnetic field and sweeping up to 3000 Oersted. Next, the applied magnetic field is reduced and a hysteresis curve is created on recording paper. Saturation magnetization, residual magnetization, and a holding force are obtained from data of the curve.

A volume electric resistance (volume resistivity) of the magnetic particle is preferably $1\times10^5$ Ω·cm or more and $1\times10^9$ Ω·cm or less, and more preferably $1\times10^7$ Ω·cm or more and $1\times10^9$ Ω·cm or less.

The volume electric resistance (Ω·cm) of the magnetic particle is measured as follows. A layer is formed by flatly placing an object to be measured on a surface of a circular jig on which a 20 $cm^2$ electrode plate is arranged so as to have a thickness of 1 mm or more and 3 mm or less. Another 20 $cm^2$ electrode plate is placed thereon to sandwich the layer. In order to eliminate voids between the object to be measured, the thickness (cm) of the layer is measured after applying a load of 4 kg on the electrode plate arranged on the layer. Both electrodes above and below the layer are connected to an electrometer and a high voltage power generator. A high voltage is applied to both electrodes so that an electric field is 103.8 V/cm, and a current value (A) flowing at this time is read. A measurement environment is under a temperature of 20° C. and a relative humidity of 50%. An equation for calculating the volume electric resistance (Ω·cm) of the object to be measured is as shown in the equation below.

$$R=E\times20/(I-I_0)/L$$

In the above equation, R represents the volume electric resistance (Ω·cm) of the object to be measured, E represents the applied voltage (V), I represents the current value (A), $I_0$ represents a current value (A) under an applied voltage of 0 V, and L represents the thickness (cm) of the layer. The coefficient 20 represents the area ($cm^2$) of the electrode plate.

[Coating Resin Layer]

The coating resin layer contains a resin. Then, the coating resin layer contains inorganic particles.

—Resin—

Examples of the resin contained in the coating resin layer include styrene-acrylic resin; polyolefin-based resins such as polyethylene and polypropylene; polyvinyl-based or polyvinylidene-based resins such as polystyrene, an acrylic resin, polyacrylonitrile, polyvinyl acetate, polyvinyl alcohol, polyvinyl butyral, polyvinyl chloride, polyvinylcarbazole, polyvinyl ether, and polyvinylketone; a vinyl chloride-vinyl acetate copolymer; straight silicone resins consisting of an organosiloxane bond or a modified product thereof; fluororesins such as polytetrafluoroethylene, polyvinyl fluoride, polyvinylidene fluoride, and polychlorotrifluoroethylene; polyester, polyurethane; polycarbonate; amino resins such as urea and formaldehyde resins; and epoxy resins.

The coating resin layer preferably contains an acrylic resin having an alicyclic structure. A polymerization component of the acrylic resin having an alicyclic structure is preferably a lower alkyl ester of (meth)acrylic acid (for example, (meth)acrylic acid alkyl ester having an alkyl group having 1 or more and 9 or less carbon atoms), and specific examples thereof include methyl (meth)acrylate, ethyl (meth)acrylate, propyl (meth)acrylate, butyl (meth) acrylate, hexyl (meth)acrylate, cyclohexyl (meth)acrylate, and 2-ethylhexyl (meth)acrylate. These monomers may be used alone or in combination of two or more kinds thereof.

The acrylic resin having an alicyclic structure preferably contains cyclohexyl (meth)acrylate as the polymerization component. A content of a monomer unit derived from the cyclohexyl (meth)acrylate contained in the acrylic resin having an alicyclic structure is preferably 75 mass % or more and 100 mass % or less, more preferably 85 mass % or more and 100 mass % or less, and still more preferably 95 mass % or more and 100 mass % or less, with respect to a total mass of the acrylic resin having an alicyclic structure.

The weight average molecular weight of the resin contained in the coating resin layer is preferably less than 300,000, more preferably less than 250,000, and still more preferably less than 200,000.

When the weight average molecular weight of the resin contained in the coating resin layer is reduced to the above range, since adhesion to the magnetic particle is high and the coating resin layer is hard to peel off when image formation is repeated, charged sites are maintained. Therefore, the toner charge maintainability is further improved.

However, a lower limit of the weight average molecular weight of the resin contained in the coating resin layer is preferably 50,000 or more, more preferably 100,000 or more from a viewpoint of the adhesion to the magnetic particle.

Here, the weight average molecular weight is measured by gel permeation chromatography (GPC). Molecular weight measurement by GPC is performed by using a measurement device GPC·HLC-8120 manufactured by Tosoh Corporation, a column TSKgel SuperHM-M (15 cm) manufactured by Tosoh Corporation, and a THF solvent. The weight average molecular weight is calculated from the measurement result using a molecular weight calibration curve prepared using a monodispersed polystyrene standard sample.

—Inorganic Particles—

Examples of the inorganic particles contained in the coating resin layer include metal oxide particles such as silica, titanium oxide, zinc oxide, and tin oxide, metal compound particles such as barium sulfate, aluminum borate, and potassium titanate, and metal particles such as gold, silver, and copper. In the present exemplary embodiment, carbon black is not treated as inorganic particles.

Among these, from a viewpoint of improving the toner charge maintainability, the inorganic particles are preferably inorganic oxide particles, and more preferably silica particles.

Particularly, the inorganic particles are preferably particles having the same charge polarity as the external additive (particularly, silica particles) of the toner. When the inorganic particles are particles having the same charge polarity as the external additive of the toner, electrostatic repulsion of the inorganic particles exposed from the coating resin layer acts to reduce the adhesive force of the carrier to the external additive. As a result, the toner charge maintainability is further improved.

Specifically, it is preferable that the inorganic particles have the same charge polarity (negative polarity) as the silica particles as the external additive of the toner.

Here, measurement of a charge polarity of particles is as follows. The charge polarity of the particles is measured by a blow-off method. Since a particle diameter of each particle is small with respect to the carrier, it is necessary to decrease a mixing ratio of the particles in order to reduce a proportion of the particles that cannot be brought into contact with the carrier. For example, the polarity can be determined by mixing 9.9 g of the carrier and 0.1 g of the particles and measuring the mixture by the blow-off method.

Surfaces of the inorganic particles may be subjected to a hydrophobic treatment. Examples of a hydrophobic treatment agent include known organic silicon compounds having an alkyl group (for example, a methyl group, an ethyl group, a propyl group, a butyl group, and the like), and specific examples thereof include an alkoxysilane compound, a siloxane compound, and a silazane compound. Among these, the hydrophobic treatment agent is preferably a silazane compound, and preferably hexamethyldisilazane. The hydrophobic treatment agent may be used alone or in combination of two or more kinds thereof.

Examples of a method for hydrophobizing the inorganic particles with the hydrophobic treatment agent include a method in which supercritical carbon dioxide is used and the hydrophobic treatment agent is dissolved in the supercritical carbon dioxide to be attached to the surfaces of the inorganic particles, a method in which a solution containing a hydrophobic treatment agent and a solvent for dissolving the hydrophobic treatment agent is applied (for example, sprayed or coated) to the surfaces of the inorganic particles in the atmosphere to attach the hydrophobic treatment agent to the surfaces of the inorganic particles, and a method in which a solution containing a hydrophobic treatment agent and a solvent for dissolving the hydrophobic treatment agent is added to and held in an inorganic particle dispersion liquid in the air, and then a mixed solution of the inorganic particle dispersion liquid and the solution is dried.

A content of the inorganic particles contained in the coating resin layer is preferably 20 mass % or more and 50 mass % or less, more preferably 25 mass % or more and 45 mass % or less, still more preferably 25 mass % or more and 40 mass % or less, and particularly preferably 30 mass % or more and 40 mass % or less, with respect to a total mass of the coating resin layer.

When a large amount of inorganic particles are contained in the coating resin layer in the above range, fine ruggedness due to the inorganic particles is imparted to the surface of the coating resin layer, and the adhesive force of the carrier to the external additive is reduced. As a result, the toner charge maintainability is further improved.

The coating resin layer may contain conductive particles for a purpose of controlling charging and resistance. Examples of the conductive particles include carbon black and conductive particles among the above-mentioned inorganic particles.

—Coating Resin Layer Forming Method—

Examples of a method for forming the coating resin layer on surfaces of the magnetic particle include a wet production method and a dry production method. The wet production method is a production method using a solvent that dissolves or disperses the resin constituting the coating resin layer. On the other hand, the dry production method is a production method that does not use the above solvent.

Examples of the wet production method include an immersion method in which the magnetic particles are immersed in a resin liquid for forming the coating resin layer to be coated, a spray method in which a resin liquid for forming the coating resin layer is sprayed on the surfaces of the magnetic particles, a fluidized bed method in which a resin liquid for forming the coating resin layer is sprayed while the magnetic particles are in a state of being fluidized in a fluidized bed, and a kneader coater method in which the magnetic particles and a resin liquid for forming the coating resin layer are mixed in a kneader coater to remove a solvent. These production methods may be repeated or combined.

The resin liquid for forming the coating resin layer used in the wet production method is prepared by dissolving or dispersing a resin, inorganic particles, and other components in a solvent. The solvent is not particularly limited, and for example, aromatic hydrocarbons such as toluene and xylene, ketones such as acetone and methyl ethyl ketone, ethers such as tetrahydrofuran and dioxane, and the like may be used.

Examples of the dry production method include a method of forming the coating resin layer by heating a mixture of the magnetic particles and a resin for forming the coating resin layer in a dry state. Specifically, for example, the magnetic particles and the resin for forming the coating resin layer are mixed in a gas phase and heated and melted to form the coating resin layer.

(Average Particle Diameter of Inorganic Particles/Average Thickness of Coating Resin Layer)

In the carrier according to the present exemplary embodiment, the average particle diameter of the inorganic particles is preferably smaller than the average thickness of the coating resin layer.

Specifically, the ratio of the average particle diameter of the inorganic particles to the average thickness of the coating resin layer (average particle diameter of inorganic particles/average thickness of coating resin layer) is preferably 0.005 or more and 0.15 or less, and more preferably 0.007 or more and 0.05 or less.

Since the average particle diameter of the inorganic particles is smaller than the average thickness of the coating resin layer and the inorganic particles are dispersed and present in the coating resin layer, the filler effect is enhanced and the coating resin layer becomes harder. The inorganic particles are exposed from the coating resin layer, and the inorganic particles impart fine ruggedness on the surface of the coating resin layer, reducing the adhesive force of the carrier to the external additive. As a result, the toner charge maintainability is further improved.

The average particle diameter of the inorganic particles is preferably 5 nm or more and 90 nm or less, more preferably 5 nm or more and 70 nm or less, still more preferably 5 nm or more and 50 nm or less, and still more preferably 8 nm or more and 50 nm or less, from the viewpoint of improving the toner charge maintainability.

The average particle diameter of the inorganic particles contained in the coating resin layer can be controlled by a size of the inorganic particles used for forming the coating resin layer.

The average thickness of the coating resin layer is preferably 0.6 μm or more and 1.4 μm or less, more preferably 0.8 μm or more and 1.2 μm or less, and still more preferably 0.8 μm or more and 1.1 μm or less, from the viewpoint of improving the toner charge maintainability.

The average thickness of the coating resin layer can be controlled by an amount of the resin used for forming the coating resin layer, and the average thickness of the coating resin layer increases as the amount of the resin relative to the amount of the magnetic particles increases.

Here, the average particle diameter of the inorganic particles contained in the coating resin layer and the average thickness of the coating resin layer are measured by the following method.

The carrier is embedded by the epoxy resin and cut with the microtome, and the sample having the carrier cross section as the observation surface is prepared. The SEM image (magnification: 20,000 times) obtained by capturing the cross section of the coating resin layer in the carrier cross section with the scanning electron microscope (SEM) is taken into the image processing analyzer for image analysis. 100 inorganic particles (primary particles) in the coating resin layer are randomly selected, and an equivalent circular diameter (nm) of each particle is calculated and arithmetically averaged to obtain the average particle diameter (nm) of the inorganic particles. The thickness (μm) of the coating resin layer is measured by randomly selecting 10 points per one particle of the carrier, and 100 particles of the carrier are further selected to measure thicknesses thereof, and all the thicknesses are arithmetically averaged to obtain the average thickness (μm) of the coating resin layer.

—Exposed Area Ratio of Magnetic Particle—

An exposed area ratio of the magnetic particle at a carrier surface according to the present exemplary embodiment is preferably 5% or more and 30% or less, more preferably 7% or more and 25% or less, and still more preferably 10% or more and 25% or less. The exposed area ratio of the magnetic particle in the carrier can be controlled by the amount of the resin used for forming the coating resin layer, and the exposed area ratio becomes smaller as the amount of the resin relative to the amount of the magnetic particles increases.

The exposed area ratio of the magnetic particle at the carrier surface is a value obtained by the following method.

A target carrier and magnetic particle obtained by removing the coating resin layer from the target carrier are prepared. Examples of a method for removing the coating resin layer from the carrier include a method of dissolving a resin component with an organic solvent to remove the coating resin layer and a method of removing the resin component by heating at about 800° C. to remove the coating resin layer. The carrier and the magnetic particle are used as measurement samples, and Fe concentrations (atomic %) on surfaces of the samples are quantified by XPS, and (Fe concentration of the carrier)/(Fe concentration of the magnetic particle)×100 is calculated and used as the exposed area ratio (%) of the magnetic particle.

A volume average particle diameter of the carrier according to the present exemplary embodiment is preferably 10 μm or more and 120 μm or less, more preferably 20 μm or more and 100 μm or less, and still more preferably 30 μm or more and 80 μm or less. The volume average particle diameter of the carrier means the particle diameter D50v at 50% accumulation from the small diameter side in a volume-based particle size distribution, and is measured by the same method as the volume average particle diameter of the magnetic particle.

<Electrostatic Charge Image Developer>

The developer according to the present exemplary embodiment is a two-component developer containing the carrier according to the present exemplary embodiment and a toner. The toner contains toner particles and, if necessary, an external additive.

A mixing ratio (mass ratio) of the carrier and the toner in the developer is preferably carrier:toner=100:1 to 100:30, more preferably 100:3 to 100:20.

[Toner Particles]

The toner particles contain, for example, a binder resin, and if necessary, a colorant, a mold releasing agent, and other additives.

—Binder Resin—

Examples of the binder resin include vinyl-based resins made of a homopolymer of monomers such as styrenes (such as styrene, parachlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or a copolymer obtained by combining two or more kinds of these monomers.

Examples of the binder resin include non-vinyl-based resins such as an epoxy resin, a polyester resin, a polyurethane resin, a polyamide resin, a cellulose resin, a polyether resin, and a modified resin, a mixture of the non-vinyl-based resin and the vinyl-based resin, or a graft polymer obtained by polymerizing a vinyl-based monomer in the presence of these non-vinyl-based resins.

These binder resins may be used alone or in combination of two or more kinds thereof.

The binder resin is suitably a polyester resin.

Examples of the polyester resin include known an amorphous polyester resin. As the polyester resin, a crystalline polyester resin may be used in combination with the amorphous polyester resin. However, the crystalline polyester resin may be used in a range in which a content thereof is 2 mass % or more and 40 mass % or less (preferably 2 mass % or more and 20 mass % or less) with respect to a total amount of the binder resin.

"Crystalline" of a resin refers to having a clear endothermic peak rather than a stepwise endothermic change in differential scanning calorimetry (DSC), and specifically means that a half width of the endothermic peak when measured at a heating rate of 10 (° C./min) is within 10° C.

On the other hand, "amorphous" of a resin means a half width of higher than 10° C., showing a stepwise endothermic change, or not showing a clear endothermic peak.

Amorphous Polyester Resin

Examples of the amorphous polyester resin include a condensed polymer of a polycarboxylic acid and a polyhydric alcohol. As the amorphous polyester resin, a commercially available product may be used, or a synthetic resin may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower (for example, having 1 or more and 5 or less carbon atoms) alkyl esters thereof. Among these, the polycarboxylic acid is preferably, for example, an aromatic dicarboxylic acid.

As the polycarboxylic acid, a trivalent or higher carboxylic acid having a crosslinked structure or a branched structure may be used in combination with the dicarboxylic acid. Examples of the trivalent or higher carboxylic acid include trimellitic acid, pyromellitic acid, anhydrides thereof, and lower (for example, having 1 or more and 5 or less carbon atoms) alkyl esters thereof.

The polycarboxylic acid may be used alone or in combination of two or more kinds thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A).

Among these, the polyhydric alcohol is preferably, for example, an aromatic diol or an alicyclic diol, and more preferably an aromatic diol.

As the polyhydric alcohol, a trihydric or higher polyhydric alcohol having a crosslinked structure or a branched structure may be used in combination with the diol. Examples of the trihydric or higher polyhydric alcohol include glycerin, trimethylolpropane, and pentaerythritol.

The polyhydric alcohol may be used alone or in combination of two or more kinds thereof.

A glass transition temperature (Tg) of the amorphous polyester resin is preferably 50° C. or higher and 80° C. or lower, and more preferably 50° C. or higher and 65° C. or lower. The glass transition temperature is obtained from a DSC curve obtained by the differential scanning calorimetry (DSC), and is more specifically obtained by the "extrapolated glass transition onset temperature" described in a method for obtaining the glass transition temperature of JIS K 7121:1987 "Method for measuring transition temperature of plastics".

A weight average molecular weight (Mw) of the amorphous polyester resin is preferably 5,000 or more and 1,000,000 or less, and more preferably 7,000 or more and 500,000 or less.

A number average molecular weight (Mn) of the amorphous polyester resin is preferably 2,000 or more and 100,000 or less.

A molecular weight distribution Mw/Mn of the amorphous polyester resin is preferably 1.5 or more and 100 or less, and more preferably 2 or more and 60 or less.

The weight average molecular weight and the number average molecular weight are measured by gel permeation chromatography (GPC). Molecular weight measurement by GPC is performed by using a GPC·HLC-8120GPC manufactured by Tosoh Corporation as a measurement device, using a column TSKgel SuperHM-M (15 cm) manufactured by Tosoh Corporation, and using a THF solvent.

The weight average molecular weight and the number average molecular weight are calculated from measurement results using a molecular weight calibration curve prepared using a monodispersed polystyrene standard sample.

The amorphous polyester resin is obtained by a known production method. Specifically, for example, the amorphous polyester resin is obtained by a method in which the polymerization temperature is set to 180° C. or higher and 230° C. or lower, the pressure inside a reaction system is reduced as necessary, and reaction is performed while removing water or alcohols generated during condensation.

When a raw material monomer is not dissolved or compatible at the reaction temperature, a solvent having a high boiling point may be added as a dissolution aid to dissolve the monomer. In this case, a polycondensation reaction is carried out while distilling off the dissolution aid. When there is a monomer with poor compatibility in a copolymerization reaction, the monomer having poor compatibility may be firstly condensed with an acid or alcohol to be polycondensed with the monomer having poor compatibility, and then the obtained product may be polycondensed with a main component.

Crystalline Polyester Resin

Examples of the crystalline polyester resin include a polycondensate of a polycarboxylic acid and a polyhydric alcohol. As the crystalline polyester resin, a commercially available product may be used, or a synthetic resin may be used.

Here, in order to easily form a crystal structure, the crystalline polyester resin is preferably a polycondensate using a linear aliphatic polymerizable monomer rather than a polymerizable monomer having an aromatic ring.

Examples of the polycarboxylic acid include aliphatic dicarboxylic acids (such as oxalic acid, succinic acid, glutaric acid, adipic acid, suberic acid, azelaic acid, sebacic acid, 1,9-nonandicarboxylic acid, 1,10-decandicarboxylic acid, 1,12-dodecanediocarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides thereof, and lower (for example, having 1 or more and 5 or less carbon atoms) alkyl esters thereof.

As the polycarboxylic acid, a trivalent or higher carboxylic acid having a crosslinked structure or a branched structure may be used in combination with the dicarboxylic acid. Examples of the trivalent carboxylic acid include aromatic carboxylic acids (such as 1,2,3-benzenetricarboxylic acid, 1,2,4-benzenetricarboxylic acid, and 1,2,4-naphthalenetricarboxylic acid), anhydrides thereof, and lower (for example, having 1 or more and 5 or less carbon atoms) alkyl esters thereof.

As the polycarboxylic acid, a dicarboxylic acid having a sulfonic acid group and a dicarboxylic acid having an ethylenic double bond may be used in combination with these dicarboxylic acids.

The polycarboxylic acid may be used alone or in combination of two or more kinds thereof.

Examples of the polyhydric alcohol include aliphatic diols (such as linear aliphatic diols having 7 or more and 20 or less carbon atoms in the main chain part). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecandiol, 1,14-tetradecanediol, 1,18-octadecanediol, and 1,20-eicosanediol. Among these, the aliphatic diol is preferably 1,8-octanediol, 1,9-nonanediol, or 1,10-decanediol.

As the polyhydric alcohol, a trihydric or higher alcohol having a crosslinked structure or a branched structure may be used in combination with the diol. Examples of the trihydric or higher alcohol include glycerin, trimethylolethane, trimethylolpropane, and pentaerythritol.

The polyhydric alcohol may be used alone or in combination of two or more kinds thereof.

Here, the polyhydric alcohol preferably has an aliphatic diol content of 80 mol % or more, and preferably 90 mol % or more.

A melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is obtained from a DSC curve obtained by the differential scanning calorimetry (DSC) according to the "melting peak temperature" described in a method for obtaining the melting temperature of JIS K7121: 1987 "Method for measuring transition temperature of plastics".

A weight average molecular weight (Mw) of the crystalline polyester resin is preferably 6,000 or more and 35,000 or less.

The crystalline polyester resin can be obtained by, for example, a known production method same as the amorphous polyester resin.

A content of the binder resin is preferably 40 mass % or more and 95 mass % or less, more preferably 50 mass % or more and 90 mass % or less, and still more preferably 60 mass % or more and 85 mass % or less with respect to a total amount of the toner particles.

—Colorant—

Examples of the colorant include pigments such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more kinds thereof.

As the colorant, a surface-treated colorant may be used as necessary, or the colorant may be used in combination with a dispersant. Plural kinds of colorants may be used in combination.

A content of the colorant is preferably 1 mass % or more and 30 mass % or less, and more preferably 3 mass % or more and 15 mass % or less, with respect to the total amount of the toner particles.

—Mold Releasing Agent—

Examples of the mold releasing agent include hydrocarbon wax, natural wax such as carnauba wax, rice wax, and candelilla wax, synthetic or mineral/petroleum wax such as montan wax, and ester wax such as fatty acid ester and montanic acid ester. The mold releasing agent is not limited thereto.

The melting temperature of the mold releasing agent is preferably 50° C. or higher and 110° C. or lower, and more preferably 60° C. or higher and 100° C. or lower.

The melting temperature is obtained from a DSC curve obtained by the differential scanning calorimetry (DSC) according to the "melting peak temperature" described in a method for obtaining the melting temperature of JIS K7121: 1987 "Method for measuring transition temperature of plastics".

A content of the mold releasing agent is preferably I mass % or more and 20 mass % or less, and more preferably 5 mass % or more and 15 mass % or less, with respect to the total amount of the toner particles.

—Other Additives—

Examples of the other additives include known additives such as a magnetic body, an electrostatic charge control agent, and an inorganic powder. These additives are contained in the toner particles as internal additives.

—Properties of Toner Particles—

The toner particles may be toner particles having a single layer structure, or may be toner particles having a so-called core-shell structure made of a core portion (core particles) and a coating layer (shell layer) coating the core portion.

The toner particles having a core-shell structure may be made of, for example, a core portion made of a binder resin and, if necessary, other additives such as a colorant and a mold releasing agent, and a coating layer made of a binder resin.

A volume average particle diameter (D50v) of the toner particles is preferably 2 μm or more and 10 μm or less, and more preferably 4 μm or more and 8 μm or less.

The volume average particle diameter (D50v) of the toner particles is measured using Coulter Multisizer II (manufactured by Beckman Coulter, Inc.) and the electrolytic solution is ISOTON-II (manufactured by Beckman Coulter, Inc.).

During measurement, 0.5 mg or more and 50 mg or less of a measurement sample is added to 2 ml of a 5 mass % aqueous solution of a surfactant (preferably sodium alkylbenzene sulfonate) as a dispersant. The obtained mixture is added to 100 ml or more and 150 ml or less of the electrolytic solution.

The electrolytic solution in which the sample is suspended is dispersed for I minute with an ultrasonic disperser, and the particle size distribution of particles having a particle diameter in a range of 2 μm or more and 60 μm or less is measured by the Coulter Multisizer II using an aperture having an aperture diameter of 100 μm. The number of the particles sampled is 50,000. A divided particle size range (channel) is set and a volume-based particle size distribution is obtained. Then, a cumulative distribution is drawn from a small particle diameter side and a particle diameter corresponding to the cumulative percentage of 50% with respect to all the particles is the volume average particle diameter D50V.

An average circularity of the toner particles is preferably 0.94 or more and 1.00 or less, and more preferably 0.95 or more and 0.98 or less.

The average circularity of the toner particles is obtained by (circle equivalent perimeter)/(perimeter) [(perimeter of a circle having the same projected area as a particle image)/(perimeter of the projected particle image)]. Specifically, the average circularity is a value measured by the following method.

First, the toner particles to be measured are sucked and collected to form a flat flow, and flash light is emitted instantly to capture a particle image as a still image. The average circularity is obtained by a flow-type particle image analyzer (FPIA-3000 manufactured by Sysmex Corporation) that analyzes the particle image. The number of samples for obtaining the average circularity is 3,500.

When the toner contains an external additive, the toner (developer) to be measured is dispersed in water containing a surfactant, and then an ultrasonic treatment is performed to obtain toner particles from which the external additive is removed.

—Method for Producing Toner Particles—

The toner particles may be manufactured by either a dry production method (such as a kneading pulverization method) or a wet production method (such as an aggregation and coalescence method, a suspension polymerization method, and a dissolution suspension method). These production methods are not particularly limited, and known production methods are adopted. Among these, it is preferable to obtain the toner particles by the aggregation and coalescence method.

Specifically, for example, when the toner particles are produced by the aggregation and coalescence method, the toner particles are produced through a step of preparing a resin particle dispersion liquid in which resin particles to be a binder resin are dispersed (resin particle dispersion liquid preparation step), a step of aggregating the resin particles (other particles if necessary) in the resin particle dispersion liquid (in a dispersion liquid after mixing with another particle dispersion liquid if necessary) to form agglomerated particles (agglomerated particle forming step), and a step of heating an agglomerated particle dispersion liquid in which the agglomerated particles are dispersed and fusing and coalescing the agglomerated particles to form the toner particles (fusion and coalescence step).

Details of each step will be described below.

In the following description, a method for obtaining toner particles containing a colorant and a mold releasing agent will be described, but the colorant and the mold releasing agent are used as needed. Of course, other additives other than the colorant and the mold releasing agent may be used.

—Resin Particle Dispersion Liquid Preparation Step—

Along with the resin particle dispersion liquid in which the resin particles to be the binder resin are dispersed, for example, a colorant particle dispersion liquid in which colorant particles are dispersed and a mold releasing agent particle dispersion liquid in which mold releasing agent particles are dispersed are prepared.

The resin particle dispersion liquid is prepared by, for example, dispersing the resin particles in a dispersion medium with a surfactant.

Examples of the dispersion medium used in the resin particle dispersion liquid include an aqueous medium.

Examples of the aqueous medium include water such as distilled water and ion-exchanged water, and alcohols. These media may be used alone or in combination of two or more kinds thereof.

Examples of the surfactant include a sulfate-based, sulfonate-based, phosphate-based, soap-based or other anionic surfactant, an amine salt type or quaternary ammonium salt type cationic surfactant, and a polyethylene glycol-based, alkylphenol ethylene oxide adduct-based, or polyhydric alcohol-based nonionic surfactant. Among these, the anionic surfactant and the cationic surfactant are particularly mentioned. The nonionic surfactant may be used in combination with the anionic surfactant or the cationic surfactant.

The surfactant may be used alone or in combination of two or more kinds thereof.

Examples of a method for dispersing the resin particles in the dispersion medium in the resin particle dispersion liquid include general dispersion methods such as a rotary shear homogenizer, a ball mill having a medium, a sand mill, and a dyno mill. Depending on a kind of the resin particles, the resin particles may be dispersed in the dispersion medium by a phase inversion emulsification method. In the phase inversion emulsification method, a resin to be dispersed is dissolved in a hydrophobic organic solvent in which the resin is soluble, and a base is added to an organic continuous phase (O phase) to neutralize the resin, and then an aqueous medium (W phase) is added to perform phase inversion from W/O to O/W, and the resin is dispersed in the aqueous medium in the form of particles.

A volume average particle diameter of the resin particles dispersed in the resin particle dispersion liquid is, for example, preferably 0.01 μm or more and 1 μm or less, more preferably 0.08 μm or more and 0.8 μm or less, and still more preferably 0.1 μm or more and 0.6 μm or less.

The volume average particle diameter D50v of the resin particles is calculated by the volume-based particle size distribution obtained by measurement with a laser diffraction type particle size distribution measuring device (for example, LA-700 manufactured by HORIBA, Ltd.). A divided particle size range is set and the volume-based particle size distribution is obtained. Then, a cumulative distribution is drawn from a small particle diameter side and a particle diameter corresponding to the cumulative percentage of 50% with respect to all the particles is the volume average particle diameter D50v. The volume average particle diameters of the particles in another dispersion liquid is measured in the same manner.

A content of the resin particles contained in the resin particle dispersion liquid is preferably 5 mass % or more and 50 mass % or less, and more preferably 10 mass % or more and 40 mass % or less.

Similar to the resin particle dispersion liquid, for example, the colorant particle dispersion liquid and the mold releasing agent particle dispersion liquid are also prepared. That is, the volume average particle diameter, dispersion medium, dispersion method, and content of particles of the particles in the resin particle dispersion liquid are the same for the colorant particles dispersed in the colorant particle dispersion liquid and the mold releasing agent particles dispersed in the mold releasing agent particle dispersion liquid.

—Agglomerated Particle Forming Step—

Next, the resin particle dispersion liquid, the colorant particle dispersion liquid, and the mold releasing agent particle dispersion liquid are mixed.

Then, the agglomerated particles containing the resin particles, the colorant particles, and the mold releasing agent particles and having a diameter close to the diameter of the target toner particles are formed by hetero-aggregating the resin particles, the colorant particles, and the release agent particles in the mixed dispersion liquid.

Specifically, for example, the agglomerated particles are formed by adding an aggregating agent to the mixed dispersion liquid, adjusting the pH of the mixed dispersion liquid to acidic (for example, a pH of 2 or more and 5 or less), adding a dispersion stabilizer as needed, heating the mixed dispersion liquid to a temperature close to the glass transition temperature (specifically, for example, the glass transition temperature of the resin particles—30° C. or higher and the glass transition temperature—10° C. or lower) of the resin particles, and aggregating the particles dispersed in the mixed dispersion liquid.

In the agglomerated particle forming step, for example, while the mixed dispersion liquid is stirred with a rotary shear homogenizer, the aggregating agent is added at room temperature (for example, 25° C.), the pH of the mixed dispersion liquid may be adjusted to acidic (for example, a pH of 2 or more and 5 or less), the dispersion stabilizer may be added if necessary, and then heating may be performed.

Examples of the aggregating agent include a surfactant having a polarity opposite to that of the surfactant contained in the mixed dispersion liquid, an inorganic metal salt, and a divalent or higher metal complex. When the metal complex is used as the aggregating agent, an amount of the surfactant used is reduced and the chargeability is improved.

An additive that forms a complex or a similar bond with metal ions of the aggregating agent may be used together with the aggregating agent, if necessary. The additive is preferably a chelating agent.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid, and aminocarboxylic acids such as iminodiacetic acid (IDA), nitrilotriacetic acid (NTA), and ethylenediaminetetraacetic acid (EDTA).

An amount of the chelating agent added is preferably 0.01 parts by mass or more and 5.0 parts by mass or less, and more preferably 0.1 parts by mass or more and less than 3.0 parts by mass, with respect to 100 parts by mass of the resin particles.

—Fusion and Coalescence Step—

Next, the agglomerated particle dispersion liquid in which the agglomerated particles are dispersed is heated to, for example, a temperature equal to or higher than the glass transition temperature of the resin particles (for example, a temperature higher than the glass transition temperature of the resin particles by 10° C. to 30° C.), so that the agglomerated particles are fused and coalesced to form the toner particles.

The toner particles are obtained through the above steps.

The toner particles may be produced through a step of obtaining an agglomerated particle dispersion liquid in which agglomerated particles are dispersed, then further mixing the agglomerated particle dispersion liquid and the resin particle dispersion liquid in which the resin particles are dispersed, and performing aggregation to further adhere and aggregate the resin particles to surfaces of the agglomerated particles to form second agglomerated particles, and a step of heating a second agglomerated particle dispersion liquid in which the second agglomerated particles are dispersed to fuse and coalesce the second agglomerated particles to form the toner particles having a core-shell structure.

After the fusion and coalescence step is completed, the toner particles formed in the solution are subjected to a known washing step, solid-liquid separation step, and drying step to obtain dried toner particles. In the washing step, from the viewpoint of the chargeability, it is preferable to sufficiently perform replacement washing with ion-exchanged water. In the solid-liquid separation step, suction filtration, pressure filtration, and the like may be performed from the viewpoint of productivity. In the drying step, from the viewpoint of productivity, freeze-drying, air-flow drying, fluid-drying, vibration-type fluid-drying, and the like may be performed.

Then, the toner according to the present exemplary embodiment is produced by, for example, adding an external additive to the obtained dried toner particles and mixing these materials. The mixing may be carried out by, for example, a V blender, a Henschel mixer, a Loedige mixer, or the like. Further, if necessary, coarse particles in the toner may be removed by using a vibration sieving machine, a wind sieving machine, or the like.

—External Additive—

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surfaces of the inorganic particles as the external additive are preferably subjected to a hydrophobic treatment. The hydrophobic treatment is performed by, for example, immersing the inorganic particles in a hydrophobic treatment agent. The hydrophobic treatment agent is not particularly limited, and examples thereof include a silane coupling agent, a silicone oil, a titanate coupling agent, and an aluminum coupling agent. The hydrophobic treatment agent may be used alone or in combination of two or more kinds thereof.

An amount of the hydrophobic treatment agent is generally, for example, 1 part by mass or more and 10 parts by mass or less with respect to 100 parts by mass of the inorganic particles.

Examples of the external additive also include resin particles (resin particles such as polystyrene, polymethylmethacrylate, and melamine resin), and cleaning activators (for example, metal salts of higher fatty acids represented by zinc stearate, and particles of a fluoropolymer).

An amount of the external additive externally added is, for example, preferably 0.01 mass % or more and 5 mass % or less, and more preferably 0.01 mass % or more and 2.0 mass % or less, with respect to the toner particles.

<Image Forming Apparatus and Image Forming Method>

An image forming apparatus according to the present exemplary embodiment includes: an image carrier; a charging unit that charges a surface of the image carrier; an electrostatic charge image forming unit that forms an electrostatic charge image on the surface of the charged image carrier; a developing unit that accommodates an electrostatic charge image developer and develops, by the electrostatic charge image developer, an electrostatic charge image formed on the surface of the image carrier as a toner imager; a transfer unit that transfers the toner image formed on the surface of the image carrier to a surface of a recording medium; and a fixing unit that fixes the toner image transferred to the surface of the recording medium. As the electrostatic charge image developer, the electrostatic charge image developer according to the present exemplary embodiment is applied.

In the image forming apparatus according to the present exemplary embodiment, an image forming method (an image forming method according to the present exemplary embodiment) is performed, which includes: a charging step of charging the surface of the image carrier; an electrostatic charge image forming step of forming the electrostatic charge image on the surface of the charged image carrier; a developing step of developing, by the electrostatic charge image developer, the electrostatic charge image formed on the surface of the image carrier as the toner image; a transfer step of transferring the toner image formed on the surface of the image carrier to the surface of the recording medium; and a fixing step of fixing the toner image transferred to the surface of the recording medium.

A known image forming apparatus such as a direct transfer type apparatus that directly transfers the toner image formed on the surface of the image carrier to the recording medium, an intermediate transfer type apparatus that primarily transfers the toner image formed on the surface of the image carrier to a surface of an intermediate transfer body, and secondarily transfers the toner image transferred to the surface of the intermediate transfer body to the surface of the recording medium, an apparatus provided with a cleaning unit for cleaning the surface of the image carrier after the transfer of the toner image and before charging, and an apparatus provided with a discharging unit for discharging the surface of the image carrier by irradiation with discharging light after the transfer of the toner image and before the charging, is applied to the image forming apparatus according to the present exemplary embodiment.

When the image forming apparatus according to the present exemplary embodiment is an intermediate transfer type apparatus, the transfer unit includes, for example, an intermediate transfer body on which a toner image is transferred onto a surface thereof, a primary transfer unit that primarily transfers the toner image formed on the surface of the image carrier onto the surface of the intermediate transfer body, and a secondary transfer unit that secondarily transfers the toner image transferred on the surface of the intermediate transfer body onto the surface of the recording medium.

In the image forming apparatus according to the present exemplary embodiment, for example, a part including the developing unit may have a cartridge structure (process cartridge) attached to and detached from the image forming apparatus. As the process cartridge, for example, a process cartridge that accommodates the electrostatic charge image developer according to the present exemplary embodiment and provided with a developing unit is preferably used.

Hereinafter, an example of the image forming apparatus according to the present exemplary embodiment will be described, but the image forming apparatus is not limited thereto. In the following description, main parts shown in the drawings will be described, and description of other parts will be omitted.

FIG. 1 is a schematic configuration diagram illustrating the image forming apparatus according to the present exemplary embodiment.

The image forming apparatus illustrated in FIG. 1 includes first to fourth electrophotographic image forming units 10Y, 10M, 10C, and 10K (image forming units) that output images of respective colors of yellow (Y), magenta (M), cyan (C), and black (K) based on image data subjected to color separation. These image forming units (hereinafter may be simply referred to as "unit") 10Y, 10M, 10C, and 10K are arranged side by side at a predetermined distance from each other in a horizontal direction. These units 10Y, 10M, 10C, and 10K may be process cartridges that are attached to and detached from the image forming apparatus.

Above the units 10Y, 10M, 10C, and 10K, an intermediate transfer belt (an example of the intermediate transfer body) 20 extends through respective units. The intermediate transfer belt 20 is provided by being wound around a drive roller 22 and a support roller 24, and travels in a direction from the first unit 10Y to the fourth unit 10K. A force is applied to the support roller 24 in a direction away from the drive roller 22 by a spring or the like (not shown), and tension is applied to the intermediate transfer belt 20 wound around the drive roller 22 and the support roller 24. An intermediate transfer body cleaning device 30 is provided on a side surface of an image carrier of the intermediate transfer belt 20 so as to face the drive roller 22.

Yellow, magenta, cyan, and black toners contained in toner cartridges 8Y, 8M, 8C, and 8K are supplied to developing devices 4Y, 4M, 4C, and 4K (an example of the developing unit) of the units 10Y, 10M, 10C, and 10K, respectively.

Since the first to fourth units 10Y, 10M, 10C, and 10K have the same configuration and operation, here, the first unit 10Y, which is arranged on an upstream side in a travelling direction of the intermediate transfer belt and forms a yellow image, will be described as a representative. 1M, 1C, and 1K in the second to fourth units 10M, 10C, and 10K are photoconductors corresponding to a photoconductor 1Y in the first unit 10Y; 2M, 2C and 2K are charging rollers corresponding to a charging roller 2Y; 3M, 3C, and 3K are laser beams corresponding to a laser beam 3Y; and 6M, 6C, and 6K are photoconductor cleaning devices corresponding to a photoconductor cleaning device 6Y.

The first unit 10Y includes the photoconductor 1Y (an example of the image carrier) that acts as an image carrier. Around the photoconductor 1Y, the following members are arranged in order: the charging roller (an example of the charging unit) 2Y that charges a surface of the photoconductor 1Y to a predetermined potential; an exposure device (an example of the electrostatic charge image forming unit) 3 that exposes the charged surface with the laser beam 3Y based on a color-separated image signal to form an electrostatic charge image; the developing device (an example of the developing unit) 4Y that supplies a charged toner to the electrostatic charge image to develop the electrostatic charge image; a primary transfer roller 5Y (an example of the primary transfer unit) that transfers the developed toner image onto the intermediate transfer belt 20; and the photoconductor cleaning device (an example of the cleaning unit) 6Y that removes the toner remaining on the surface of the photoconductor 1Y after the primary transfer.

The primary transfer roller 5Y is arranged on an inner side of the intermediate transfer belt 20 and is provided at a position facing the photoconductor 1Y. A bias power supply (not shown) that applies a primary transfer bias is connected to each of the primary transfer rollers 5Y, 5M, 5C, and 5K of respective units. Each bias power supply changes a value of the transfer bias applied to each primary transfer roller under the control of a controller (not shown).

Hereinafter, an operation of forming a yellow image in the first unit 10Y will be described.

First, prior to the operation, the surface of the photoconductor 1Y is charged to a potential of −600 V to −800 V by using the charging roller 2Y.

The photoconductor 1Y is formed by laminating a photoconductive layer on a conductive substrate (for example, having a volume resistivity of $1\times10^{-6}$ Ω·cm or less at 20° C.). The photoconductive layer usually has high resistance (resistance of general resin), but has a property that when irradiated with a laser beam, the specific resistance of the portion irradiated with the laser beam changes. Therefore, the charged surface of the photoconductor 1Y is irradiated with the laser beam 3Y from the exposure device 3 in accordance with yellow image data sent from the controller (not shown). As a result, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to flow charges charged on the surface of the photoconductor 1Y and by, on the other hand, leaving charges of a portion not irradiated with the laser beam 3Y.

The electrostatic charge image formed on the photoconductor 1Y rotates to a predetermined developing position as travelling of the photoconductor 1Y. Then, at this developing position, the electrostatic charge image on the photoconductor 1Y is developed and visualized as a toner image by the developing device 4Y.

In the developing device 4Y, for example, an electrostatic charge image developer containing at least a yellow toner and a carrier is accommodated. The yellow toner is triboelectrically charged by being stirred inside the developing device 4Y, and has charges of the same polarity (negative polarity) as the charges charged on the photoconductor 1Y and is carried on a developer roller (an example of a developer holder). Then, when the surface of the photoconductor 1Y passes through the developing device 4Y, the yellow toner electrostatically adheres to a discharged latent image portion on the surface of the photoconductor 1Y, and the latent image is developed by the yellow toner. The photoreceptor 1Y on which the yellow toner image is formed continuously travels at a predetermined speed, and the toner image developed on the photoconductor 1Y is conveyed to a predetermined primary transfer position.

When the yellow toner image on the photoconductor 1Y is conveyed to the primary transfer position, a primary transfer bias is applied to the primary transfer roller 5Y, an electrostatic force from the photoconductor 1Y to the primary transfer roller 5Y acts on the toner image, and the toner image on the photoconductor 1Y is transferred onto the intermediate transfer belt 20. The transfer bias applied at this time has a polarity (+) opposite to the polarity (−) of the toner, and is controlled to, for example, +10 μA by the controller (not shown) in the first unit 10Y.

On the other hand, the toner remaining on the photoconductor 1Y is removed and collected by the photoconductor cleaning device 6Y.

The primary transfer biases applied to the primary transfer rollers 5M, 5C, and 5K of the second unit 10M and the subsequent units are also controlled in the same manner as in the first unit.

In this way, the intermediate transfer belt 20 to which the yellow toner image is transferred by the first unit 10Y is sequentially conveyed through the second to fourth units 10M, 10C, and 10K, and toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roller 24 in contact with an inner surface of the intermediate transfer belt, and a secondary transfer roller (an example of a secondary transfer unit) 26 arranged on an image carrying surface side of the intermediate transfer belt 20. On the other hand, a recording paper (an example of the recording medium) P is fed through a supply mechanism into a gap where the secondary transfer roller 26 and the intermediate transfer belt 20 are in contact with each other at a predetermined timing, and a secondary transfer bias is applied to the support roller 24. The transfer bias applied at this time has the same polarity (−) as the polarity (−) of the toner. An electrostatic force from the intermediate transfer belt 20 to the recording paper P acts on the toner image, and the toner image on the intermediate transfer belt 20 is transferred onto the recording paper P. The secondary transfer bias at this time is determined according to the resistance detected by a resistance detecting unit (not shown) that detects the resistance of the secondary transfer unit, and is subjected to voltage control.

Thereafter, the recording paper P is sent to a pressure contact portion (nip portion) of a pair of fixing rollers in a fixing device 28 (an example of the fixing unit), and the toner image is fixed onto the recording paper P, thereby forming a fixed image.

Examples of the recording paper P onto which the toner image is transferred include plain paper used in electrophotographic copiers and printers. As the recording medium, in addition to the recording paper P, an OHP sheet or the like may be used.

In order to further improve the smoothness of an image surface after fixing, the surface of the recording paper P is also preferably smooth. For example, coated paper obtained by coating the surface of the plain paper with a resin or the like, art paper for printing, or the like is preferably used.

The recording paper P, on which the fixing of the color image is completed, is conveyed out toward a discharge unit, and a series of color image forming operations is completed.

<Process Cartridge>

The process cartridge according to the present exemplary embodiment includes a developing unit that accommodates the electrostatic charge image developer according to the present exemplary embodiment and develops, by the electrostatic charge image developer, the electrostatic charge image formed on the surface of the image carrier as the toner image, and is attached to and detached from the image forming apparatus.

The process cartridge according to the present exemplary embodiment is not limited to the above configuration and may be configured to include a developing unit and, if necessary, at least one selected from other units such as an image carrier, a charging unit, an electrostatic charge image forming unit, and a transfer unit.

Hereinafter, an example of the process cartridge according to the present exemplary embodiment will be shown, but the process cartridge is not limited thereto. In the following description, main parts shown in the drawings will be described, and description of other parts will be omitted.

Figure 2:
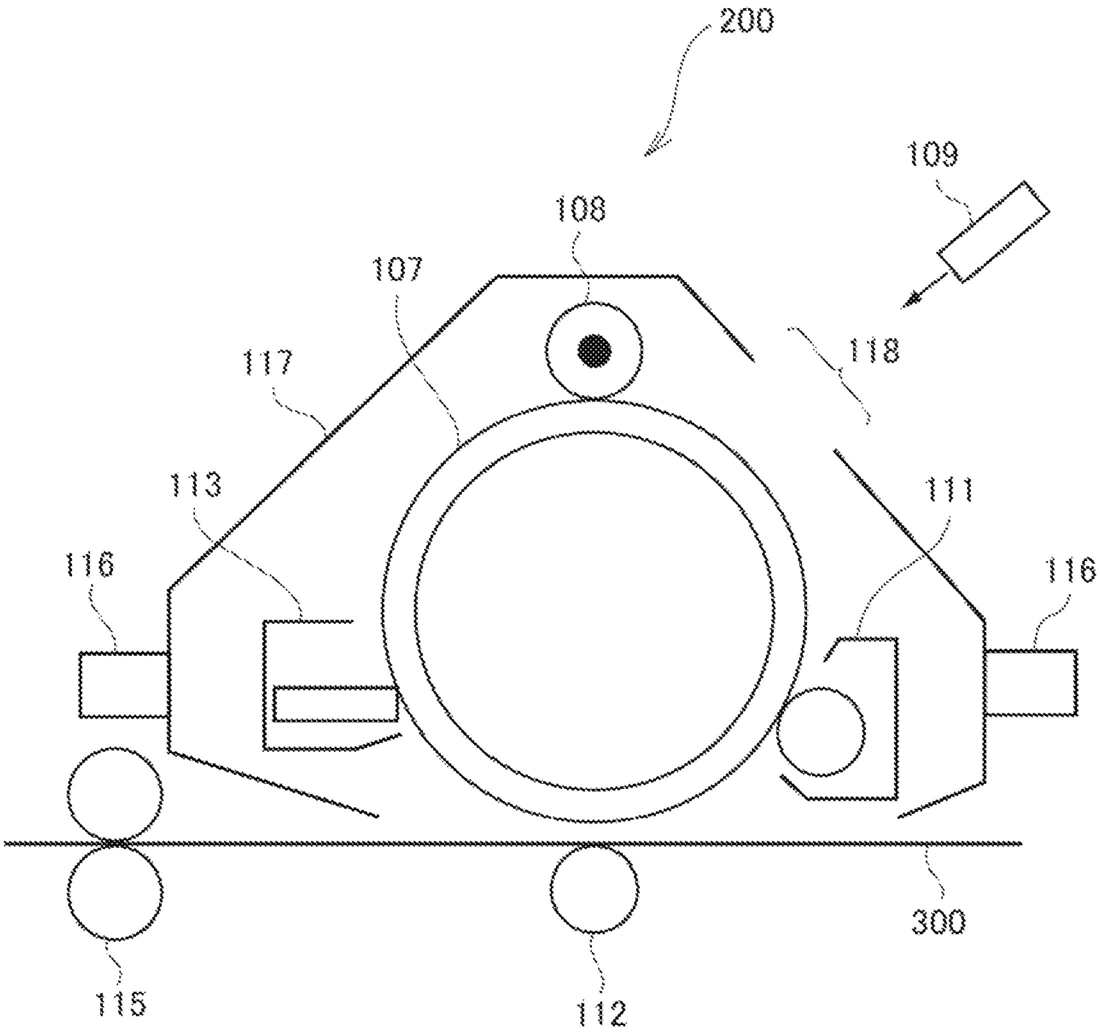
FIG. 2 is a schematic configuration diagram illustrating an example of a process cartridge attached to and detached from the image forming apparatus according to the present exemplary embodiment.

FIG. 2 is a schematic configuration diagram illustrating the process cartridge according to the present exemplary embodiment.

A process cartridge 200 shown in FIG. 2 is formed as a cartridge by, for example, integrally combining and holding a photoconductor 107 (an example of the image carrier), a charging roller 108 (an example of the charging unit), an image developing device 111 (an example of the developing unit), and a photoconductor cleaning device 113 (an example of a cleaning unit) provided around the photoconductor 107 by a housing 117 provided with a mounting rail 116 and an opening 118 for exposure.

In FIG. 2, 109 denotes an exposure device (an example of the electrostatic charge image forming unit), 112 denotes a transfer device (an example of the transfer unit), 115 denotes a fixing device (an example of the fixing unit), and 300 denotes recording paper (an example of the recording medium).

EXAMPLES

Hereinafter, the exemplary embodiment of the invention will be described in detail with reference to Examples, but the exemplary embodiment of the invention is not limited to these Examples. In the following description, all "parts" and "%" are based on mass unless otherwise specified.

Example 1

[Preparation of Ferrite Particles]

1318 parts of $Fe_2O_3$, 587 parts of $Mn(OH)_2$, and 96 parts of $Mg(OH)_2$ are mixed and temporarily calcined at a temperature of 900° C. for 4 hours. The temporarily calcined product, 6.6 parts of polyvinyl alcohol, 0.5 parts of polycarboxylic acid as a dispersant, and zirconia beads having a media diameter of 1 mm are charged into water, pulverized and mixed in a sand mill to obtain a dispersion liquid. A volume average particle diameter of particles in the dispersion liquid is 1.5 μm.

The dispersion liquid is used as a raw material and granulated and dried with a spray dryer to obtain granules having a volume average particle diameter of 37 μm. Next, under an oxygen-nitrogen mixed atmosphere having an oxygen partial pressure of 1%, final calcination is performed using an electric furnace at a temperature of 1450° C. for 4 hours, and then heating was performed in air at a temperature of 900° C. for 3 hours to obtain fired particles. The fired particles are crushed and classified to obtain ferrite particles (1) having a volume average particle diameter of 35 μm. An arithmetic average height Ra (JIS B0601:

2001) of a roughness curve of the ferrite particles is 0.6 μm.

[Coating Agent (1)]

Resin (1) Perfluoropropylethyl methacrylate/methyl methacrylate copolymer (mass-based polymerization ratio: 30:70, weight average molecular weight Mw=19000): 12.1 parts Resin (2) Cyclohexyl methacrylate resin (weight average molecular weight: 350,000): 8.1 parts Carbon black (Cabot Corporation, VXC72): 0.8 parts Inorganic particles (1): 9 parts (Commercially available hydrophilic silica particles (fumed silica particles, without surface treatment, volume average particle diameter: 40 nm)) Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, and a coating agent (1) is obtained.

[Preparation of Carrier (1)]

1,000 parts of the ferrite particles (1) and half of the coating agent (1) are charged into a kneader and mixed at room temperature (25° C.) for 20 minutes.

Then, the mixture is dried by heating to 70° C. and reducing in pressure.

A dried product is cooled to room temperature (25° C.), half of the coating agent (1) is additionally added, and the mixture is mixed at room temperature (25° C.) for 20 minutes.

Then, the mixture is dried by heating to 70° C. and reducing in pressure.

Next, a dried product is taken out from the kneader, and coarse powder is sieved and removed with a mesh having a mesh size of 75 μm to obtain a carrier (1).

Examples 2 to 32 and Comparative Examples 1 and 2

According to Table 1, a carrier of each example is obtained in the same manner as in Example 1 except that the amount of the resin (1), the amount of the resin (2), and the amount and kind of the inorganic particles (1) are changed.

<Various Properties of Carrier>

The following properties of the carrier of each example are measured according to the methods described above.

Area ratio of the inorganic particles (denoted as "inorganic particle area ratio" in the table) in the cut surface of the coating resin layer along the thickness direction of the coating resin layer Average of distances between centers of gravity of the inorganic particles, each of the distances between centers of gravity of the inorganic particles being a distance between centers of gravity of a pair of two particles of the inorganic particles, one particle of the pair being farthest from the other particle of the pair without interposing any particle of the inorganic particles other than the pair of the two particles. (denoted as "average of distances between centers of gravity of inorganic particles" in the table)

<Evaluation of Toner Charge Maintainability>

In the image forming apparatus ("Iridesse Production Press" manufactured by Fuji Xerox Co., Ltd.), a developer in which the carrier and the toner of each example are mixed at a mass ratio of 100:8 is charged into the developing device at a C color position.

50,000 sheets of printing are performed by the image forming apparatus, about 20 g of the developer at the initial stage and after 50,000 sheets of printing is sampled, blow-off is performed to remove the toner from the sampled developer, and only a carrier is isolated. With respect to 10 g of the isolated carrier, 0.8 g of the toner used for preparing the developer is newly added to the isolated carrier and stirred with a Turbula mixer for 5 minutes to measure the charge amount. A ratio of the carrier charge amount of an initial developer to the carrier charge amount of the developer after 50,000 sheets of printing (charge ratio after 50,000 sheets of printing with respect to the initial state) is calculated, and the toner charge maintainability is evaluated according to the following criteria.

A: The ratio of the carrier charge amount is 0.9 or more.

B: The ratio of the carrier charge amount is 0.85 or more and less than 0.9.

C: The ratio of the carrier charge amount is 0.8 or more and less than 0.85.

D: The ratio of the carrier charge amount is 0.7 or more and less than 0.8.

E: The ratio of the carrier charge amount is less than 0.7.

TABLE 1-1

| | Coating agent | | | | | | | | Coating resin layer |
|---|---|---|---|---|---|---|---|---|---|
| | Resin | | Amount | Amount | Inorganic particle | | | | Inorganic particle |
| | kind | Mw × 10000 | PFEM/MM (part) | CHM (part) | kind | Amount (part) | Average particle diameter D [nm] | | content [mass %] |
| Example 1 | PFEM/MM CHM | 15 | 12.1 | 8.1 | 1 | 9.0 | 40 | | 30 |
| Example 2 | PFEM/MM CHM | 15 | 13.0 | 8.6 | 1 | 5.6 | 40 | | 20 |
| Example 3 | PFEM/MM CHM | 15 | 10.1 | 6.7 | 1 | 14.4 | 40 | | 50 |
| Example 4 | PFEM/MM CHM | 15 | 10.1 | 6.7 | 7 | 14.4 | 93 | | 50 |

TABLE 1-1-continued

| | | | | | | | | |
|---|---|---|---|---|---|---|---|---|
| Example 5 | PFEM/MM CHM | 15 | 10.7 | 7.1 | 6 | 12.4 | 88 | 40 |
| Example 6 | PFEM/MM CHM | 15 | 12.6 | 8.4 | 3 | 7.3 | 7 | 25 |
| Example 7 | PFEM/MM CHM | 15 | 12.6 | 8.4 | 2 | 7.3 | 4 | 25 |
| Example 8 | PFEM/MM CHM | 15 | 18.4 | 12.3 | 2 | 13.5 | 4 | 30 |
| Example 9 | PFEM/MM CHM | 15 | 17.2 | 11.4 | 3 | 12.6 | 7 | 30 |
| Example 10 | PFEM/MM CHM | 15 | 6.7 | 4.4 | 6 | 5.1 | 88 | 30 |
| Example 11 | PFEM/MM CHM | 15 | 5.8 | 3.9 | 7 | 4.5 | 93 | 30 |
| Example 12 | PFEM/MM CHM | 15 | 12.1 | 8.1 | 2 | 9.0 | 4 | 30 |
| Example 13 | PFEM/MM CHM | 15 | 12.1 | 8.1 | 3 | 9.0 | 7 | 30 |
| Example 14 | PFEM/MM CHM | 15 | 12.1 | 8.1 | 6 | 9.0 | 88 | 30 |
| Example 15 | PFEM/MM CHM | 15 | 12.1 | 8.1 | 7 | 9.0 | 93 | 30 |
| Example 16 | PFEM/MM, CHM | 15 | 5.8 | 3.9 | 1 | 4.5 | 40 | 30 |
| Example 17 | PFEM/MM, CHM | 15 | 6.7 | 4.4 | 1 | 5.1 | 40 | 30 |
| Example 18 | PFEM/MM, CHM | 15 | 17.2 | 11.4 | 1 | 12.6 | 40 | 30 |
| Example 19 | PFEM/MM, CHM | 15 | 18.4 | 12.3 | 1 | 13.5 | 40 | 30 |
| Example 20 | PFEM/MM, CHM | 15 | 13.3 | 8.9 | 4 | 5.0 | 12 | 18 |
| Example 21 | PFEM/MM, CHM | 15 | 13.0 | 8.6 | 4 | 5.6 | 12 | 20 |
| Example 22 | PFEM/MM, CHM | 15 | 9.4 | 6.3 | 5 | 16.5 | 62 | 50 |
| Example 23 | PFEM/MM, CHM | 15 | 9.0 | 6.0 | 5 | 17.2 | 62 | 52 |
| Example 24 | PFEM/MM, CHM | 28 | 4.0 | 16.2 | 1 | 9.0 | 40 | 30 |
| Example 25 | CHM | 35 | 0.0 | 20.2 | 1 | 9.0 | 40 | 30 |
| Example 26 | PFEM/MM, CHM | 25 | 6.1 | 14.1 | 1 | 9.0 | 40 | 30 |
| Example 27 | PFEM/MM, CHM | 15 | 9.8 | 11.8 | 8 | 9.6 | 40 | 30 |
| Example 28 | PFEM/MM, CHM | 15 | 9.8 | 11.8 | 9 | 9.6 | 40 | 30 |
| Example 29 | PFEM/MM, CHM | 15 | 9.8 | 11.8 | 10 | 9.6 | 10 | 30 |
| Example 30 | PFEM/MM, CHM | 15 | 9.8 | 11.8 | 11 | 9.6 | 30 | 30 |
| Example 31 | PFEM/MM, CHM | 15 | 9.8 | 11.8 | 12 | 9.6 | 50 | 30 |
| Example 32 | PFEM/MM, CHM | 15 | 9.8 | 11.8 | 13 | 9.6 | 60 | 30 |
| Comparative Example 1 | PFEM/MM, CHM | 15 | 13.3 | 8.9 | 1 | 4.1 | 40 | 15 |
| Comparative Example 2 | PFEM/MM, CHM | 15 | 8.2 | 5.4 | 1 | 21.6 | 40 | 60 |

| | Coating resin layer | | Inorganic | Average of distances between centers of | Toner charge maintainability | |
|---|---|---|---|---|---|---|
| | Average thickness T [μm] | D/T | particle area ratio [%] | gravity of inorganic particles [nm] | Carrier charge amount | Evaluation |
| Example 1 | 1 | 0.040 | 25 | 120 | 0.98 | A |
| Example 2 | 1 | 0.040 | 11 | 190 | 0.75 | D |
| Example 3 | 1 | 0.040 | 48 | 25 | 0.77 | D |
| Example 4 | 1 | 0.093 | 46 | 8 | 0.78 | D |
| Example 5 | 1 | 0.088 | 33 | 12 | 0.83 | C |
| Example 6 | 1 | 0.007 | 20 | 195 | 0.82 | C |
| Example 7 | 1 | 0.004 | 19 | 220 | 0.77 | D |
| Example 8 | 1.5 | 0.003 | 23 | 140 | 0.76 | D |
| Example 9 | 1.4 | 0.005 | 24 | 135 | 0.83 | C |
| Example 10 | 0.6 | 0.147 | 26 | 95 | 0.82 | C |
| Example 11 | 0.5 | 0.186 | 27 | 80 | 0.74 | D |
| Example 12 | 1 | 0.004 | 22 | 150 | 0.76 | D |
| Example 13 | 1 | 0.007 | 25 | 145 | 0.82 | C |
| Example 14 | 1 | 0.088 | 26 | 110 | 0.83 | C |
| Example 15 | 1 | 0.093 | 28 | 105 | 0.74 | D |
| Example 16 | 0.5 | 0.080 | 26 | 125 | 0.78 | D |
| Example 17 | 0.6 | 0.067 | 27 | 115 | 0.81 | C |
| Example 18 | 1.4 | 0.029 | 24 | 120 | 0.81 | C |
| Example 19 | 1.5 | 0.027 | 25 | 125 | 0.76 | D |
| Example 20 | 1 | 0.012 | 11 | 200 | 0.71 | D |
| Example 21 | 1 | 0.012 | 13 | 190 | 0.81 | C |
| Example 22 | 1 | 0.062 | 45 | 17 | 0.83 | C |
| Example 23 | 1 | 0.062 | 47 | 14 | 0.78 | D |
| Example 24 | 1 | 0.040 | 25 | 120 | 0.84 | C |
| Example 25 | 1 | 0.040 | 25 | 120 | 0.78 | D |
| Example 26 | 1 | 0.040 | 25 | 120 | 0.88 | B |
| Example 27 | 1 | 0.040 | 25 | 120 | 0.86 | B |
| Example 28 | 1 | 0.040 | 26 | 115 | 0.85 | B |
| Example 29 | 1 | 0.010 | 26 | 160 | 0.82 | C |
| Example 30 | 1 | 0.030 | 25 | 140 | 0.81 | C |
| Example 31 | 1 | 0.050 | 24 | 115 | 0.79 | D |
| Example 32 | 1 | 0.060 | 27 | 110 | 0.77 | D |
| Comparative Example 1 | 1 | 0.040 | 8 | 240 | 0.6 | E |
| Comparative Example 2 | 1 | 0.040 | 55 | 5 | 0.62 | E |

From the above results, it can be seen that the toner charge maintainability is excellent in the present example as compared with the comparative example.

Abbreviations in the table are as follows. PFEM/MM: Perfluoropropyl ethyl methacrylate Methyl methacrylate copolymer (mass-based polymerization ratio: 30:70, weight average molecular weight Mw=19000) CHM: Cyclohexyl methacrylate resin (weight average molecular weight: 350, 000) Mw: weight average molecular weight of mixed resin or single resin <Preparation of Toner>

The toner used in evaluation of the toner charge maintainability is a toner prepared as follows.

[Preparation of Amorphous Polyester Resin Dispersion Liquid (A1)]

Ethylene glycol: 37 parts

Neopentyl glycol: 65 parts 1,9-nonaedioyl: 32 parts

Terephthalic acid: 96 parts

The above materials are charged into a flask and raised to a temperature of 200° C. over 1 hour, and after confirming that the inside of the reaction system is uniformly stirred, 1.2 parts of dibutyltin oxide is added. The temperature is raised to 240° C. over 6 hours while water to be produced is distilled off, and stirring is continued at 240° C. for 4 hours to obtain an amorphous polyester resin (acid value: 9.4 mgKOH/g, weight average molecular weight: 13,000, glass transition temperature: 62° C.). The amorphous polyester resin is transferred to an emulsification disperser (CAVITRON CD1010 manufactured by Eurotech Co., Ltd.) at a rate of 100 g per minute in a molten state. Separately, dilute ammonia water having a concentration of 0.37% obtained by diluting reagent ammonia water with ion exchange water is put into a tank and transferred to the emulsification disperser at the same time as the amorphous polyester resin at a rate of 0.1 liter per minute while being heated to 120° C. in a heat exchanger. The emulsification disperser is operated under conditions of a rotation speed of 60 Hz and a pressure of 5 $kg/cm^2$ of a rotor to obtain an amorphous polyester resin dispersion liquid (A1) having a volume average particle diameter of 160 nm and a solid content of 20%.

[Preparation of Crystalline Polyester Resin Dispersion Liquid (C1)]

Decanedioic acid: 81 parts

Hexanediol: 47 parts

The above materials are charged into a flask and raised to a temperature of 160° C. over I hour, and after confirming that the inside of the reaction system is uniformly stirred, 0.03 parts of dibutyltin oxide is added. The temperature is raised to 200° C. over 6 hours while water to be produced is distilled off, and stirring is continued at 200° C. for 4 hours. Next, a reaction liquid is cooled and solid-liquid separation is performed, and a solid is dried under a reduced pressure at a temperature of 40° C. to obtain a crystalline polyester resin (C1) (melting point: 64° C., weight average molecular weight: 15,000).

Crystalline polyester resin (C1): 50 parts

Anionic surfactant (NEOGEN RK manufactured by Daiichi Kogyo Seiyaku Co., Ltd.): 2 parts Ion-exchanged water: 200 parts The above materials are heated to 120° C., sufficiently dispersed by a homogenizer (ULTRA-TURRAX T50 manufactured by IKA Co., Ltd.), and then subjected to a dispersion treatment with a pressure discharge type homogenizer. When the volume average particle diameter reaches 180 nm, the mixture is recovered, and a crystalline polyester resin dispersion liquid (C1) having a solid content of 20% is obtained.

[Preparation of Mold Releasing Agent Particle Dispersion Liquid (W1)]

Paraffin wax (HNP-9 manufactured by Nippon Seiro Co., Ltd.): 100 parts

Anionic surfactant (NEOGEN RK manufactured by Daiichi Kogyo Seiyaku Co., Ltd.): 1 part Ion-exchanged water: 350 parts The above materials are mixed and heated to 100° C., dispersed using the homogenizer (ULTRA-TURRAX T50 manufactured by IKA Co., Ltd.), and then subjected to a dispersion treatment with a pressure discharge type Gaulin homogenizer to obtain a mold releasing agent particle dispersion liquid in which release agent particles having a volume average particle diameter of 200 nm are dispersed. Ion-exchange water is added to the mold releasing agent particle dispersion liquid to prepare a solid content of 20%, thereby obtaining a release agent particle dispersion liquid (W1).

[Preparation of Colorant Particle Dispersion Liquid (C1)]

Cyan pigment (Pigment Blue 15:3, manufactured by Dainichiseika Color & Chemicals Mfg. Co., Ltd.): 50 parts Anionic surfactant (NEOGEN RK manufactured by Daiichi Kogyo Seiyaku Co., Ltd.): 5 parts Ion-exchanged water: 195 parts The above materials are mixed and subjected to a dispersion treatment for 60 minutes using a high-pressure impact type disperser (ULTIMAIZER HJP30006 manufactured by Sugino Machine Limited) to obtain a colorant particle dispersion liquid (C1) having a solid content of 20%.

<Preparation of Inorganic Particles in Coating Resin Layer of Carrier>

The inorganic particles in the coating resin layer of the carrier are as follows.

[Inorganic Particles (1)]

Commercially available hydrophilic silica particles (fumed silica particles, without surface treatment, volume average particle diameter: 40 nm) are prepared as inorganic particles (1).

[Inorganic Particles (2)]

890 parts of methanol and 210 parts of 9.8% ammonia water are charged into a 1.5 L glass reaction vessel equipped with a stirrer, a dropping nozzle, and a thermometer and mixed to obtain an alkaline catalyst solution. After the alkaline catalyst solution is adjusted to 45° C., 550 parts of tetramethoxysilane and 140 parts of 7.6% ammonia water are simultaneously added dropwise over 450 minutes while stirring to obtain a silica particle dispersion liquid (A). The silica particles in the silica particle dispersion liquid (A) have a volume average particle diameter of 4 nm and a volume particle size distribution index of 1.2 (the volume particle size distribution index is $(D84v/D16v)^{1/2}$ which is square root of a ratio of a particle diameter D84v at 84% accumulation to a particle diameter Dl 6v at 16% accumulation from the small diameter side in the volume-based particle size distribution $(D84v/D16v)^{1/2}$).

300 parts of the silica particle dispersion liquid (A) is charged into an autoclave equipped with a stirrer, and the stirrer is rotated at a rotation speed of 100 rpm. While the stirrer is continuously rotated, liquefied carbon dioxide is injected into the autoclave from a carbon dioxide cylinder via a pump, a pressure inside the autoclave is raised by the pump while the temperature is raised by a heater, and the inside of the autoclave is brought into a supercritical state of 150° C. and 15 MPa. A pressure valve is operated to circulate supercritical carbon dioxide while keeping the inside of the autoclave at 15 MPa, and methanol and water are removed from the silica particle dispersion liquid (A). When an amount of carbon dioxide supplied into the autoclave became 900 parts, supply of carbon dioxide is stopped to obtain a powder of silica particles.

In a state in which the inside of the autoclave is maintained at 150° C. and 15 MPa by the heater and the pump to maintain the supercritical state of carbon dioxide, 50 parts of hexamethyldisilazane with respect to 100 parts of silica particles is injected into the autoclave by an entrainer pump while the stirrer of the autoclave is continuously rotated, the temperature inside the autoclave is raised to 180° C., and a reaction is carried out for 20 minutes. Next, the supercritical carbon dioxide is circulated again in the autoclave, and excess hexamethyldisilazane is removed. Next, stirring is stopped, the pressure valve is opened to release the pressure in the autoclave to atmospheric pressure, and the temperature is lowered to room temperature (25° C.). In this way, silica particles surface-treated with the hexamethyldisilazane are obtained. The silica particles have a volume average particle diameter of 4 nm. The obtained silica particles are inorganic particles (2).

[Inorganic Particles (3)]

In the same manner as the preparation of the inorganic particles (2), amounts of the tetramethoxysilane and the 7.6% ammonia water dropped when the silica particle dispersion liquid (A) is prepared are increased to change the volume average particle diameter of the silica particles in the silica particle dispersion liquid to 6 nm, thereby obtaining silica particles surface-treated with the hexamethyldisilazane. The silica particles have a volume average particle diameter of 7 nm. The obtained silica particles are inorganic particles (3).

[Inorganic Particles (4)]

Commercially available hydrophobic silica particles (fumed silica particles surface-treated with hexamethyldisilazane, volume average particle diameter: 12 nm) are prepared as inorganic particle (4).

[Inorganic Particles (5)]

Commercially available hydrophilic silica particles (fumed silica particles, without surface treatment, volume average particle diameter: 62 nm) are prepared as inorganic particles (5).

[Inorganic Particles (6)]

Commercially available hydrophobic silica particles (fumed silica particles surface-treated with hexamethyldisilazane, volume average particle diameter: 88 nm) are prepared as inorganic particle (6).

[Inorganic Particles (7)]

Commercially available hydrophobic silica particles (fumed silica particles surface-treated with hexamethyldisilazane, volume average particle diameter 93 nm) are prepared as inorganic particle (7).

[Inorganic Particles (8)]

Commercially available calcium carbonate particles (volume average particle diameter: 40 nm) are prepared as inorganic particles (8).

[Inorganic Particles (9)]

Commercially available barium carbonate particles (volume average particle diameter: 40 nm) are prepared as inorganic particles (9).

[Inorganic Particles (10)]

Commercially available barium sulfate particles (BARIFINE BF-40, volume average particle diameter: 10 nm) are prepared as inorganic particles (10).

[Inorganic Particles (11)]

Commercially available barium sulfate particles (BARIFINE BF-20, volume average particle diameter: 30 nm) are prepared as inorganic particles (11).

[Inorganic Particles (12)]

Commercially available barium sulfate particles (BARIFINE BF-21, volume average particle diameter: 50 nm) are prepared as inorganic particles (12).

[Inorganic Particles (13)]

Commercially available barium sulfate particles (BARIFINE BF-10, volume average particle diameter: 60 nm) are prepared as inorganic particles (13).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing carrier, comprising:

a magnetic particle; and a coating resin layer coating the magnetic particle and containing inorganic particles, wherein an area ratio of the inorganic particles that is a ratio of a total area of the inorganic particles to an area of the coating resin layer in a cut surface of the coating resin layer along a thickness direction of the coating resin layer is 10% or more and 50% or less;

a content of the inorganic particles is 18 mass % or more and 40 mass % or less with respect to a resin contained in the coating resin layer; and an average particle diameter of the inorganic particles is 5 nm or more and 40 nm or less.

2. The electrostatic charge image developing carrier according to claim 1, wherein in the cut surface, an average of distances between centers of gravity of the inorganic particles is 200 nm or less, each of the distances between centers of gravity of the inorganic particles being a distance between centers of gravity of a pair of two particles of the inorganic particles, one particle of the pair being farthest from the other particle of the pair without interposing any particle of the inorganic particles other than the pair of the two particles.

3. The electrostatic charge image developing carrier according to claim 1, wherein an average particle diameter of the inorganic particles is smaller than an average thickness of the coating resin layer.

4. The electrostatic charge image developing carrier according to claim 2, wherein an average particle diameter of the inorganic particles is smaller than an average thickness of the coating resin layer.

5. The electrostatic charge image developing carrier according to claim 3, wherein a ratio of the average particle diameter of the inorganic particles to the average thickness of the coating resin layer is 0.005 or more and 0.15 or less.

6. The electrostatic charge image developing carrier according to claim 4, wherein a ratio of the average particle diameter of the inorganic particles to the average thickness of the coating resin layer is 0.005 or more and 0.15 or less.

7. The electrostatic charge image developing carrier according to claim 3, wherein the average thickness of the coating resin layer is 0.6 μm or more and 1.4 μm or less.

8. The electrostatic charge image developing carrier according to claim 1, wherein the inorganic particles are inorganic oxide particles.

9. The electrostatic charge image developing carrier according to claim 1, wherein the content of the inorganic particles is 20 mass % or more and 30 mass % or less with respect to the resin contained in the coating resin layer.

10. The electrostatic charge image developing carrier according to claim 1, wherein a weight average molecular weight of the resin contained in the coating resin layer is less than 300,000.

11. The electrostatic charge image developing carrier according to claim 10, wherein the weight average molecular weight of the resin contained in the coating resin layer is less than 250,000.

12. An electrostatic charge image developer, comprising:

an electrostatic charge image developing toner; and the electrostatic charge image developing carrier according to claim 1.

13. The electrostatic charge image developer according to claim 12, wherein the electrostatic charge image developing toner includes an external additive having the same charge polarity as the inorganic particles of the electrostatic charge image developing carrier.

14. A process cartridge configured to be attached to and detached from an image forming apparatus, the process cartridge comprising:

a developing unit that accommodates the electrostatic charge image developer according to claim 12, and is configured to develop an electrostatic charge image as a toner image by the electrostatic charge image developer, the electrostatic charge image being formed on a surface of an image carrier.

15. An image forming apparatus, comprising:

an image carrier;

a charging unit configured to charge a surface of the image carrier;

an electrostatic charge image forming unit configured to form an electrostatic charge image on the surface of the image carrier charged;

a developing unit that accommodates the electrostatic charge image developer according to claim 12, and is configured to develop the electrostatic charge image as a toner image by the electrostatic charge image developer;

a transfer unit configured to transfer the toner image formed on the surface of the image carrier to a surface of a recording medium; and a fixing unit configured to fix the toner image transferred to the surface of the recording medium.

16. An image forming method, comprising:

charging a surface of an image carrier;

forming an electrostatic charge image on the surface of the image carrier charged;

developing the electrostatic charge image as a toner image by the electrostatic charge image developer according to claim 12;

transferring the toner image formed on the surface of the image carrier to a surface of a recording medium; and fixing the toner image transferred to the surface of the recording medium.

17. The electrostatic charge image developing carrier according to claim 1, wherein the resin layer contains an acrylic resin having an alicyclic structure.

18. The electrostatic charge image developing carrier according to claim 1, wherein the resin layer contains cyclohexyl (meth)acrylate as a polymerization component.

* * * * *